United States Patent
Hwang et al.

(10) Patent No.: US 10,354,514 B1
(45) Date of Patent: Jul. 16, 2019

(54) DETECTING AND HANDLING MATERIAL LEFT IN VEHICLES BY TRANSPORTATION REQUESTORS

(71) Applicant: Lyft, Inc., San Francisco, CA (US)

(72) Inventors: Thaddeus Insuk Hwang, San Francisco, CA (US); Jesse Michael Garms, Seattle, WA (US); Luc Vincent, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 0 days.

(21) Appl. No.: 16/189,866

(22) Filed: Nov. 13, 2018

Related U.S. Application Data

(63) Continuation of application No. 15/859,629, filed on Dec. 31, 2017, now Pat. No. 10,127,795.

(51) Int. Cl.
| | |
|---|---|
| *G06K 9/00* | (2006.01) |
| *H04W 4/02* | (2018.01) |
| *H04W 4/40* | (2018.01) |
| *G06Q 50/30* | (2012.01) |
| *G08B 21/24* | (2006.01) |

(52) U.S. Cl.
CPC ......... *G08B 21/24* (2013.01); *G06K 9/00832* (2013.01); *G06Q 50/30* (2013.01); *H04W 4/025* (2013.01); *H04W 4/40* (2018.02)

(58) Field of Classification Search
CPC ............... G06Q 50/30; G06Q 10/047; G06Q 10/06311; G06Q 50/32; B64C 2201/145; G01C 21/343
See application file for complete search history.

(56) References Cited

U.S. PATENT DOCUMENTS

| | | |
|---|---|---|
| 10,127,795 B1 | 11/2018 | Hwang et al. |
| 2012/0041675 A1 | 2/2012 | Juliver et al. |
| 2017/0132696 A1 | 5/2017 | Haparnas et al. |
| 2017/0213165 A1 | 7/2017 | Stauffer et al. |

OTHER PUBLICATIONS

U.S. Appl. No. 15/859,629, Aug. 29, 2018, Notice of Allowance.

*Primary Examiner* — Omeed Alizada
(74) *Attorney, Agent, or Firm* — Keller Jolley Preece

(57) ABSTRACT

The present disclosure includes embodiments of systems, methods, and computer readable media that enable a dynamic transportation system to detect when material has been left in a vehicle by a requestor. In some embodiments, the system detects the completion of the transportation request, analyzes data from a plurality of vehicle sensors, from a computing device associated with the vehicle, and from a computing device associated with the requestor, and then determines, based on the data analysis, that material has been left in the vehicle. The system then performs an action for handling the material based on one or more attributes of the material.

20 Claims, 9 Drawing Sheets

DETECTING AND HANDLING MATERIAL LEFT IN VEHICLES BY TRANSPORTATION REQUESTORS

CROSS REFERENCE TO RELATED APPLICATIONS

The present application is a continuation of U.S. application Ser. No. 15/859,629, filed Dec. 31, 2017. The aforementioned application is hereby incorporated by reference in its entirety.

BACKGROUND

Modern technologies now facilitate the use of mobile app-based transportation matching systems. For instance, when users are traveling or are in situations where renting a vehicle or using a user's own vehicle is burdensome, inefficient, or unavailable, users frequently utilize transportation matching systems to get to where they need to go. These transportation matching systems receive transportation requests from requestor computing devices, and then match the transportation requests to provider computing devices. However, conventional transportation matching systems suffer from several disadvantages that detrimentally affect system efficiency.

One disadvantage posed by many conventional transportation matching systems is that technical issues limit conventional systems from detecting and properly handling material left in provider vehicles by requestors. For example, in many conventional transportation systems, if a requestor leaves something in the vehicle, the provider or requestor may not initially notice. Furthermore, in many instances, at the time a provider drops off one requestor, the transportation matching system has already matched the provider to another transportation request. As a result, once the left material is noticed, conventional systems often must cancel the provider's subsequent transportation request, which wastes time and resources for both the provider and the transportation matching system, and results in a negative transportation experience for the requestors. This problem is further aggravated if the requestor leaves a mobile device in the vehicle, in which case conventional systems are typically unable to contact or locate the requestor. Not only is this inconvenient for requestors and providers, it causes an undue strain on the bandwidth, efficiency, and processing time of conventional systems, which have to process and manage the resulting cancellations, additional transportation requests, and intermittent availability of providers.

These and other disadvantages exist with regard to the conventional transportation systems.

SUMMARY

Systems, methods, and computer readable media described herein enable dynamic transportation matching systems to match transportation requests received from requestor computing devices with vehicle computing devices, detect completion of the transportation request, and analyze data from a plurality of sources, including but not limited to sensors within a vehicle, a computing device associated with the vehicle, and a requestor's computing device. Based on the analyzed data, the dynamic transportation matching system determines that material has been left in the vehicle by the requestor and performs an action for handling the material left in the vehicle based on attributes of the material.

Embodiments of the present disclosure provide benefits and/or solve one or more of the foregoing or other problems in the art. Specifically, the disclosed system utilizes data obtained from multiple sources to efficiently detect and handle material (e.g., mobile devices, personal items, or waste) left within a vehicle associated with a transportation network. The features and embodiments disclosed herein allow transportation systems to resolve problems associated material left in vehicles without the typical inconvenience, inefficiency, and system strain caused in conventional transportation systems. Not only do the embodiments disclosed herein lessen frustration for transportation requestors and providers, but they also improve system efficiency by avoiding the resulting transportation request cancellations, repeated transportation requests, updated optimization calculations, and provider dispatch modifications from bogging down the system and slowing processing time. Indeed, the embodiments disclosed herein increase processing speed of the system overall by more effectively and efficiently detecting when material is left in a vehicle and identifying the actions necessary to handle the material that is left in a vehicle.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

Various embodiments will be described and explained with additional specificity and detail through the use of the accompanying drawings in which.

DETAILED DESCRIPTION

Figure 1:
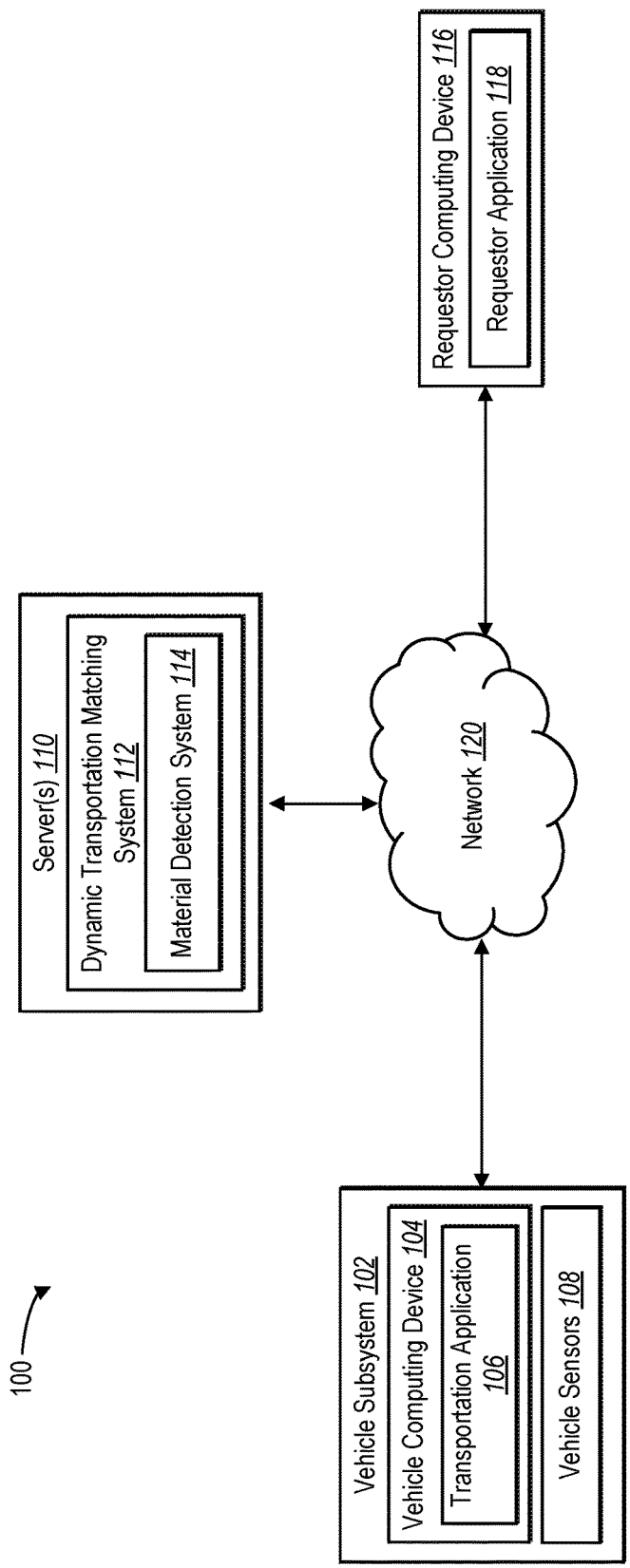
FIG. 1 illustrates an example environmental diagram of the dynamic transportation matching system in accordance with one or more embodiments.

This disclosure describes a dynamic transportation matching system (hereinafter "transportation system") that accesses and analyzes data from a plurality of vehicle sensors, computing devices associated with vehicles, and computing devices associated with requestors to determine that material (e.g., a cell phone or waste) has been left in the vehicle. In particular, a dynamic transportation matching system accesses data from the plurality of sensors, a requestor computing device, and a computing device associated with the vehicle (or "vehicle computing device"). After detecting that a transportation request is complete (i.e., that a requestor has been dropped off at a destination), the system analyzes the data to determine whether material has been left in the vehicle. If the transportation system detects that material has been left in the vehicle, the transportation system identifies and performs an action for handling the material based on one or more attributes of the material.

In some embodiments, the system uses data received from requestor and vehicle computing devices to detect that the requestor computing device (e.g., the requestor's mobile device) has been left in the vehicle after the requestor was dropped off at a destination. For example, in at least one embodiment, in order to determine whether the requestor's computing device is still in the vehicle, the system determines a relative proximity or distance between the requestor computing device and vehicle computing device. For instance, the system may obtain GPS location data from both devices to compare the geographical locations of the devices. Additionally, the system may receive indications from each device regarding the presence and strength of communication signals (e.g., Bluetooth signals) sent/received between the devices to determine a proximity of the devices. Using the location and communication information, the system can detect whether the requestor computing device is within a proximity to the vehicle computing device even after the vehicle computing device has moved away from the dropoff location, thereby indicating that the requestor computing device was left in the vehicle.

In addition to analyzing and comparing the locations of the computing devices, in some embodiments, the system analyzes motion data associated with the computing devices to determine if a requestor computing device has been left in a vehicle. For example, the system may receive data collected by motion sensors in the requestor computing device and the vehicle computing device (i.e., a provider computing device and/or a computing device integrated within a vehicle) indicating movement of the requestor computing device, the vehicle computing device, and/or the vehicle. For instance, the motion data can include accelerometer data, gyroscope data, proximity sensor data, magnetometer data, etc. Using the received motion sensor data, the system can, for example, determine acceleration, speed, and rotation of the requestor computing device, the vehicle computing device, and the vehicle. In some embodiments, the system compares the motion data from the requestor computing device to the motion data from the vehicle computing device to identify consistencies between the data (e.g., similar acceleration, speed, and rotation), thereby indicating that the devices are in the same vehicle. In further embodiments, the system analyzes the motion data from the requestor computing device independently to determine if the motion of the requestor computing device is more consistent with traveling in a vehicle (indicating that the device is still in the vehicle) or on a person walking (indicating that the device is being carried by the requestor after being dropped off by the vehicle).

In addition to analyzing data from motion sensors in the requestor computing device and the vehicle computing device, the system may analyze interaction data associated with other sensors or detection devices (e.g., cameras, microphones, touchscreens, proximity sensors, buttons) of the requestor computing device to determine if the requestor computing device has been left in the vehicle. For example, the system may receive data collected by touchscreen sensors associated with the requestor computing device indicating requestor interaction with the requestor computing device. Additionally, the system may receive camera image data from the requestor computing device and determine whether the data is consistent with being left in the vehicle (e.g., if the image is of the interior of a car) as opposed to being consistent with being in the possession of the requestor (e.g., if the image includes the face of the requestor). The system may also access data from other sensors such as the ambient light sensor and identification sensors (e.g., fingerprint sensor or facial recognition) for the requestor computing device. For instance, the system may determine that the requestor computing device has not been left in the vehicle based on data indicating that the requestor has recently (i.e., after the requestor was dropped off) used a fingerprint sensor or facial recognition function on the requestor computing device to unlock the device. In yet further embodiments, the system may determine that the requestor computing device has been left in the vehicle if audio data collected by a microphone of the requestor computing device is similar to audio data collected by a microphone of the vehicle computing device.

In addition to analyzing interaction data from the requestor computing device, in at least one embodiment, the system uses data received from a plurality of sensors associated with the vehicle (e.g., sensors within the vehicle) to detect that material has been left in the vehicle. For example, the plurality of sensors can include one or more microphones for collecting audio data within the vehicle, one or more cameras for capturing images/video within the vehicle, one or more weight sensors for sensing weight on the seats within the vehicle, one or more olfactory or air quality sensors for sensing impurities or irregularities within the air of the vehicle, and/or one or more moisture sensors for detecting moisture within the vehicle (e.g., on the seats or carpet of the vehicle). Using the data from the plurality of sensors, the system can, for example, detect sounds caused by an item left in the vehicle, detect objects within images of the interior of the vehicle (e.g., utilizing one or more object detection algorithms on the captured images), detect the weight of an item left on a seat in the vehicle, detect moisture in a seat or other upholstery of the vehicle, and/or detect odors caused by material left in the vehicle. In some embodiments, the system gathers data from the sensors before picking up a requestor, during transportation of the requestor, and/or after the requestor is dropped off. Using the gathered data, the system is able to, for example, learn a baseline for each sensor that represents a state of the vehicle prior to picking up a requestor. The system can then compare the data gathered after the requestor has been dropped off to the baseline data to identify changes indicating that material was left in the vehicle by the requestor. In some embodiments, the system trains a machine learning model to analyze the data and determine whether material has been left in the vehicle. By using a comprehensive suite of sensors and corresponding data analysis, the system is able to identify a wide range of material (e.g., personal items, garbage, and bodily fluids) as opposed to, for example, just electronic devices.

Using the collected and analyzed data discussed above and in more detail below, the system is able to determine whether material has been left in a vehicle after a requestor has been dropped off at a location. In some embodiments, the system aggregates the date and calculates a confidence score indicating a likelihood that material has been left in the vehicle. For example, the system can determine whether each piece of data indicates that material has been left in the vehicle, and then aggregate these indications and calculate a confidence score of how strongly the data indicates the presence of material in the vehicle. Additionally, the system can weight the effect of each type of data on the confidence score based on, for example, a reliability of each type of data in predicting the presence of material in a vehicle, an amount of each type of data, a consistency of multiple sources of data, and a strength of correlation between different types of data and different materials. The system can then use the calculated score to determine whether material has been left in the vehicle (e.g., by comparing the confidence score to a predetermined threshold).

In addition to determining whether material has been left in a vehicle, the system can identify one or more attributes of the material. For example, using the gathered data and corresponding analysis, the system can determine a type of material left in the vehicle, a quantity of the material left in the vehicle, a size and shape of the material left in the vehicle, a color of the material left in the vehicle, etc. Using the determined attributes of the material, the system can then identify and execute an action for handling the material that is customized for the specific attributes of the material.

As mentioned, the system can perform an action for handling material left in a vehicle. Furthermore, the action can be specific to the attributes of the material. In some embodiments, the system automatically performs the action without human intervention. For example, the system can automatically take the vehicle out of service (e.g., by not matching additional transportation requests to the vehicle computing device), alert a driver of the vehicle (e.g., via an automated notification, text message, or phone call), reassign a subsequent transportation request originally matched to the vehicle to another vehicle/provider, cause the vehicle to return to the destination location of the requestor, alert the requestor (e.g., via an automated notification, text message, or phone call to the requestor computing device), alert a third-party associated with the requestor (e.g., a traveling companion or emergency contact), or cause the vehicle to travel to a service station. In accordance with the foregoing, the system is able to quickly and efficiently identify and remedy situations involving material left in vehicles by requestors, thereby easing the burden and processing drag typically resulting from such situations. For this and other reasons, the current disclosure improves the functioning of computer systems associated with transportation systems. Furthermore, the disclosed system is able to analyze, detect, and address materials left in vehicles, of which conventional systems are incapable.

Turning now to the figures, FIG. 1 illustrates a schematic diagram of an environment 100 for implementing a dynamic transportation matching system 112 (or "transportation system 112") in accordance with one or more embodiments. This disclosure provides an overview of the dynamic transportation matching system 112 with reference to FIG. 1. After providing an overview, the disclosure describes components and processes of the dynamic transportation matching system 112 in further detail with reference to subsequent figures.

As used herein, the term "requestor" refers to person (or group of people) who use a computing device to submit a transportation request to a dynamic transportation matching system. A requestor may refer to a person who requests a ride or other form of transportation but who is still waiting for pickup. A requestor may also refer to a person whom a transportation vehicle has picked up and who is currently riding within the transportation vehicle to a destination location (e.g., a destination indicated by a requestor). Additionally, a requestor may refer to a person whom a transportation vehicle has dropped off at a destination location. A requestor may be associated with the requestor computing device 116.

Accordingly, the term "requestor computing device" refers to a computing device associated with a requestor. Typically, a requestor computing device includes a mobile device, such as a laptop, smartphone, or tablet associated with a requestor. But the requestor computing device 116 may be any type of computing device. A requestor computing device 116 includes requestor application 118. In some embodiments, the requestor application 118 comprises a native or web-based application used for interacting with the dynamic transportation matching system 112. A requestor computing device may also contain sensors including touch sensors, cameras, ambient sensors, and identification sensors (e.g., fingerprint sensors and facial recognition). Additionally, in some instances, the dynamic transportation matching system 112 provides data packets including instructions that, when executed by the requestor computing device 116, instruct create or otherwise integrate transportation application 106 within an application or webpage.

Relatedly, the term "provider" refers to a driver or other person who operates a transportation vehicle and/or who interacts with a vehicle computing device. For instance, a provider includes a person who drives a transportation vehicle along various routes to pick up and drop off requestors. In certain embodiments, the vehicle subsystem 102 is associated with a provider. However, in other embodiments, some or all of the vehicle subsystems 102 is not associated with a provider, but rather includes an autonomous transportation vehicle—that is, a self-driving vehicle that includes computer components and accompanying sensors for driving without manual input from a human operator. When a transportation vehicle is an autonomous vehicle, the transportation vehicle may include additional components not depicted in FIG. 1, such as location components, one or more sensors by which the autonomous vehicle navigates, and/or other components necessary to navigate without a provider (or with minimal interactions from a provider).

As shown in FIG. 1, the environment 100 includes the dynamic transportation matching system 112 located on server(s) 110, requestor computing device 116, and vehicle subsystem 102. The dynamic transportation matching system 112 may communicate with the vehicle subsystem 102 and the requestor computing device 116 via the network 120. For example, the dynamic transportation matching system 112 communicates with the vehicle computing device 104 and the requestor computing device 116 via the network 120 to determine locations of the vehicle computing device 104 and the requestor computing device 116. Per device settings, for instance, the dynamic transportation matching system 112 may receive location coordinates from the vehicle computing device 104 and/or the requestor computing device 116. Based on the location coordinates, the dynamic transportation matching system 112 determines the geographic area in which the vehicle computing device 104 and/or the requestor computing device 116 are located.

As used in this disclosure, the term "destination location" refers to a geographic location in a larger geographic area. A destination location may be an area specified by the requestor computing device as the final destination of a transportation request. For example, the requestor computing device may specify an address as the destination location. A destination location may also be the area in which a requestor is dropped off and leaves the vehicle.

As used herein, "transportation request" refers to a request from one computing device. More specifically, a transportation request is a request sent by the requestor computing device that includes relevant information to enable the vehicle subsystem 102 to locate and transport the requestor to a destination location. In at least one embodiment, a transportation request may include information such as the desired pickup location and destination location. For example, a requestor associated with requestor computing device 116 may input, via the requestor application 118, an address as a destination location and the requestor's current location as a pickup location. The requestor application 118 may compile this information and other relevant information and send the information as a transportation request to the transportation matching system 110, which matches the transportation request to an available vehicle subsystem (such as vehicle subsystem 102). The transportation request is completed when the requestor associated is dropped off at the destination location. For example, transportation request completion may be detected by the transportation matching system 112 based on communications received from the vehicle computing device 104 and/or requestor computing device 116 indicating user input or an automatic detection that the requestor has been dropped off at the destination location.

In some embodiments, the dynamic transportation matching system 112 sends a request from the requestor computing device 116 to the vehicle computing device 104 within a vehicle subsystem 102. As used herein, term "vehicle subsystem" refers to a system comprising a vehicle, computing device, and other components. For example, a vehicle subsystem includes a transportation vehicle (not shown), vehicle sensors (such as vehicle sensors 108), and a computing device associated with the vehicle or corresponding provider (such as the vehicle computing device 104). The transportation vehicle may be an automobile or other vehicle. In some embodiments, the computing device associated with the vehicle performs functions for facilitating completion of a transportation request and/or controls the operation of various functions of the vehicle subsystem. For example, when the dynamic transportation matching system 112 sends a transportation request to the vehicle subsystem 102—or queries location information from the vehicle subsystem 102—in some embodiments the dynamic transportation matching system 112 sends the transportation request or location query to the vehicle computing device 104. The vehicle computing device 104 may be associated with a human operator (or "provider") of the vehicle subsystem 102, or may be integrated into the vehicle subsystem. Furthermore, although FIG. 1 illustrates a single vehicle computing device, in other embodiments, the vehicle subsystem 102 can include multiple computing devices associated with corresponding providers or integrated into the vehicle itself.

As illustrated in FIG. 1, the environment 100 includes material detection system 114 as part of the dynamic transportation matching system 112. The material detection system 114 may communicate with the dynamic transportation matching system 112 regarding transportation requests. More specifically, the material detection system 114 may receive data from the dynamic transportation matching system 112 regarding a transportation request received from the requestor computing device 116 and matched to the vehicle subsystem 102. In some embodiments, the data indicates a status of the transportation request (e.g., whether the requestor associated with requestor computing device 116 has been picked up, if the requestor is in the vehicle, a progress of the vehicle along the requested route, and when the requestor has been dropped off at a destination location).

The material detection system 114 also detects when a requestor associated with the requestor computing device 116 has left material in the vehicle of the vehicle subsystem 102. As used herein, the term "material" refers to any personal items or other matter that might be introduced into the vehicle by a requestor. For example, material may include electronics (e.g., the requestor computing device), other personal items (e.g., purse, backpack, food, and drink), bodily fluids (e.g., vomit, urine), and other matter left behind by a requestor. To illustrate, a requestor may leave a mobile device and a backpack in the vehicle at the end of a ride.

The material detection system 114 may be configured to collect data from various data collection devices including vehicle sensors 108, requestor computing device 116, and vehicle computing device 104. The material detection system 114 collects data to determine whether the requestor associated with the requestor computing device 116 has left material in the vehicle. For example, material detection system 114 receives data from the data collection devices before the requestor enters the vehicle, while the requestor is in the vehicle, and/or after the requestor has left the vehicle at the destination location. Material detection system 114 may analyze the collected data to determine whether material has been left in the vehicle after the transportation request has been completed (i.e., the requestor has been dropped off at a destination location), as will be discussed in more detail below.

In addition to detecting the presence of material left in a vehicle, the material detection system 114 further discerns attributes of the material left in the vehicle, based on the collected data, to determine an appropriate action to handle the material left in the vehicle. Additionally, material detection system 114 communicates with vehicle computing device 104, requestor computing device 116, and other components of the dynamic transportation matching system 112 as part of performing an appropriate action for handling the material. For example, the material detection system 114 may call or message the vehicle computing device 104, call or message the requestor computing device 116, or cause the vehicle subsystem 102 to return to the destination location where the requestor was dropped off.

In some embodiments, the material detection system 114 uses an appropriate operating system as well as various server applications, such as common gateway interface (CGI) servers, JAVA servers, hypertext transport protocol (HTTP) servers, file transfer protocol (FTP) servers, database servers, etc. As illustrated, the material detection system 114 is located on the server(s) 110. However, in one or more embodiments, one or more components of the material detection system 114 may be integrated locally into the vehicle subsystem 102.

In some embodiments, the vehicle subsystem includes one or more vehicle sensors 108, as shown in FIG. 1. The term, "vehicle sensors" refers to a plurality of sensors associated with the vehicle. For instance, in some embodiments, the vehicle sensors 108 collect data associated the vehicle interior. For example, the vehicle sensors 108 can include cameras, moisture sensors, audio sensors, olfactory sensors, or weight/pressure sensors associated with the vehicle subsystem 102. The vehicle sensors 108 send collected data to the dynamic transportation matching system 112 (e.g., using the transportation application 106) for analysis by the material detection system 114. For instance, vehicle subsystem 102 may send, to the material detection system 114 digital images from the vehicle interior before the vehicle picked up a requestor associated with requestor computing device 116 and after the vehicle has dropped off the requestor associated with the requestor computing device 116. As will be described in more detail below, the material detection system 114 can then analyze the data to detect the presence of material left in the vehicle by the requestor.

As mentioned, the vehicle subsystem 102 may be associated with a human provider (i.e., operator) of the vehicle subsystem 102. In other embodiments, the vehicle subsystem 102 includes an autonomous or self-driving vehicle, including a computer-based navigation and driving system (e.g., controlled or facilitated by the vehicle computing device 104). Regardless of whether the vehicle subsystem 102 is human-operated or autonomous, the vehicle subsystem 102 may also include a locator device, such as a GPS device, that determines the location of the vehicle subsystem 102.

As mentioned above, the vehicle subsystem 102 includes vehicle computing device 104. The vehicle computing device 104 may be separate or integrated into the vehicle itself. For example, the vehicle computing device 104 may refer to a separate mobile device, such as a laptop, smartphone, or tablet associated with the vehicle subsystem 102. But the vehicle computing device 104 may be any type of computing device. Additionally, or alternatively, the vehicle computing device 104 may be a subcomponent of a vehicle computing system. Regardless of its form, the vehicle computing device 104 may include various sensors, such as a GPS locator, an inertial measurement unit, an accelerometer, a gyroscope, a magnetometer, a Bluetooth signal sensor/antenna, and/or other sensors that collect information and data regarding the location, current state, and surroundings of the vehicle computing device 104.

As further shown in FIG. 1, the vehicle computing device 104 includes transportation application 106. In some embodiments, the transportation application 106 comprises a native software application that facilitates interactions with the dynamic transportation matching system 112 (e.g., to receive transportation requests). Additionally, in some instances, the dynamic transportation matching system 112 provides data packets including instructions that, when executed by the vehicle computing device 104, create or otherwise integrate the transportation application 106 within an application or webpage.

In some embodiments, the dynamic transportation matching system 112 communicates with the vehicle computing device 104 through the transportation application 106. Additionally, the transportation application 106 optionally include computer-executable instructions that, when executed by the vehicle computing device 104, cause the vehicle computing device 104 to perform certain functions. For instance, the transportation application 106 can cause the provider computing device 106 to communicate with the material detection system 114 to determine an appropriate action for handling material left in the vehicle.

In certain embodiments, the dynamic transportation matching system 112 matches transportation requests with available providers. For instance, the dynamic transportation matching system 112 manages the distribution and allocation of transportation requests to the vehicle subsystem 102 based on, for example, location and availability indicators. To facilitate matching requests with transportation vehicles, the dynamic transportation matching system 112 communicates with the vehicle computing device 104 (through the transportation application 106) and with the requestor computing device 116 (through the requestor application 118).

As shown in FIG. 1, the server(s) 110 may comprise one or more server devices that implement the dynamic transportation matching system 112. The server(s) 110 can also comprise a communication server or a web-hosting server. Additional details regarding the server(s) 110 will be discussed below.

Figure 2:
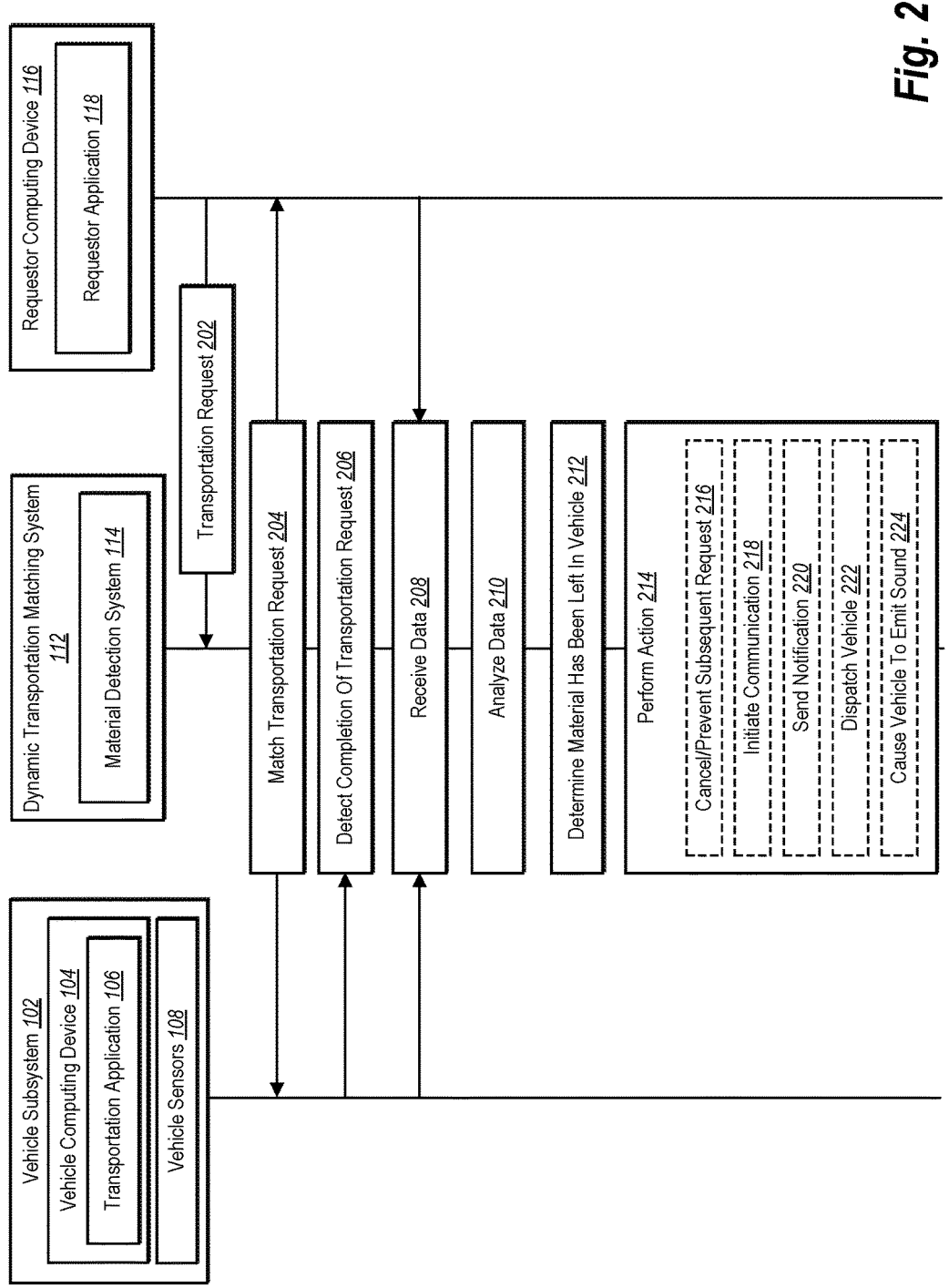
FIG. 2 illustrates an example sequence flow diagram of the transportation matching system determining that material has been left in a vehicle in accordance with one or more embodiments.

FIG. 2 illustrates a series of acts performed by the vehicle subsystem 102, the matching detection system 114, and the requestor computing device 116 in accordance with one or more embodiments of the features disclosed herein. While FIG. 2 illustrates a single requestor computing device 116 and a single vehicle subsystem 102, it will be understood from this disclosure that the dynamic transportation matching system 112 can similarly interact with any number of additional vehicle subsystems (or computing devices associated with a vehicle/provider) and requestor computing devices. Furthermore, while FIG. 2 illustrates a particular order or sequence for the acts depicted therein, the acts may be performed in an alternative order and may further include additional or alternative acts as well.

As illustrated by sequence 200 of FIG. 2, the requestor computing device 116 sends a ride request to the dynamic transportation matching system 112, as depicted by act 202. Initially, the dynamic transportation matching system 112 receives a transportation request from requestor application 118 on the requestor computing device 116. The transportation request may include a pick up location for the ride request, a requestor identifier, a requestor computing device location, a destination location, and/or any other relevant information associated with the transportation request and/or requestor.

As further illustrated in FIG. 2, the dynamic transportation matching system 112 matches the transportation request 204. To match the transportation request 204, the dynamic transportation matching system 112 identifies and assigns vehicle computing device 104 of vehicle subsystem 102) as a match to pick up and transport the requestor associated with requestor computing device 116. In matching the vehicle computing device 104 to the received transportation request, the dynamic transportation matching system 112 utilizes information received from the vehicle computing device 104, such as the current location of the vehicle computing device 104, to assign the transportation request to the vehicle computing device 104. In some embodiments, the vehicle computing device 104 may automatically accept the received transportation request. In other embodiments, a provider associated with vehicle computing device 104 provides user input to accept the transportation request. As part of step 204, the dynamic transportation matching system 112 may receive a response indicating acceptance of the transportation request. Furthermore, the dynamic transportation matching system 112 provides information to the vehicle computing device 104 to facilitate completion of the transportation request. For example, the dynamic transportation matching system 112 may send the vehicle computing device 104 pickup location information, route information, destination location information, and user profile information.

The dynamic transportation matching system 112 can monitor the location of the vehicle computing device 104 and the requestor computing device 116 and send location information to the respective other device. Thus, as the vehicle computing device 104 gets closer to pick up location, the dynamic transportation matching system may monitor the location of the vehicle computing device 104 and send the location of the requestor computing device 116 to the vehicle computing device 104. Additionally, the transportation matching system 112 can monitor the location of the vehicle computing device 104 and the requestor computing device 116 while the vehicle computing device 104 is on route to the destination location. Furthermore, in some embodiments, the requestor computing device 116 may communicate locally and directly with the vehicle computing device 104 (e.g., using Bluetooth communications), as will be explained in more detail below.

At step 206 of FIG. 2, the dynamic transportation matching system 112 detects the completion of the matched transportation request. For example, dynamic transportation matching system 112 detects completion of the transportation request based on a communication received from the vehicle computing device 104 or requestor computing device 116, indicating that the requestor has been dropped off at a destination location. In some embodiments, the transportation application 106 sends the dynamic transportation matching system 112 a dropoff notification. The vehicle subsystem 102 may send the dropoff notification when the provider associated with the vehicle subsystem 102 indicates that the requestor has been dropped off. Alternatively, the vehicle computing device 104 associated with an autonomous vehicle may automatically detect that the requestor has been dropped off, and then send the indication to the dynamic transportation matching system 112.

As illustrated in FIG. 2, at step 208, the material detection system 114 receives data from the vehicle subsystem 102 and the requestor computing device 116. Data from the vehicle subsystem 102 includes data collected by the vehicle sensors 108. For example, the vehicle sensors 108 may include cameras, audio sensors, pressure sensors, moisture sensors, olfactory sensors, and/or additional sensors. Data may be collected by the vehicle sensors 108 before the requestor entered the vehicle, while the requestor was in the vehicle, and/or after the requestor exited the vehicle. In some embodiments, the vehicle computing device 104 communicates locally with the vehicle sensors 108 to gather the collected data and then send the data to dynamic transportation matching system 112.

The data can also include data sensed/collected by the requestor computing device 116 and vehicle computing device 104. Namely, the material detection system 114 may receive location data, motion data, communication data, interaction data, and any other suitable data from vehicle computing device 104 and requestor computing device 116 (e.g., as gathered by sensors of the vehicle computing device 104 and requestor computing device 116). For example, the vehicle computing device 104 and the requestor computing device 116 may send, to the material detection system 114, their respective geographic locations. Additionally, the vehicle computing device 104 and requestor computing device 116 may collect and send data regarding signal strength readings and communications between the vehicle computing device 104 and the requestor computing device 116. Furthermore, both the vehicle computing device 104 and the requestor computing device 116 may send motion data and interaction data to the dynamic transportation matching system 112, as discussed above. In yet further embodiments, the dynamic transportation matching system 112 receives data from other sources (e.g., additional computing devices associated with the requestor or a traveling companion of the requestor, third-party providers of weather and traffic data).

As illustrated in FIG. 2, the material detection system 114 analyzes the received data 210. In step 210, material detection system 114 analyzes data received from the plurality of vehicle sensors 108, vehicle computing device 104, and requestor computing device 116. In some embodiments, the material detection system 114 analyzes the data to determine consistencies or differences between data regarding the vehicle's interior collected prior to the requestor entering the vehicle and data regarding the vehicle's interior collected after the requestor exited the vehicle. For example, the material detection system 114 compares data collected by the vehicle sensors 108 and vehicle computing device 104 before the requestor entered the vehicle with data collected by the vehicle sensors 108 and vehicle computing device 104 after the requestor left the vehicle. Additionally, the material detection system 114 may compare those two sets of data with another obtained while the requestor was in the vehicle. Based on the data comparison, the material detection system 114 may, for example, determine that differences detected occurred when the requestor entered the vehicle or during transportation of the requestor remained even after the requestor left the vehicle. For example, the material detection system 114 may analyze data from a moisture sensor that indicated that a seat in the vehicle that was dry before the requestor entered the vehicle became measurably damp while the requestor was in the vehicle, and then remained damp after the requestor left the vehicle. Thus, the material detection system 114 might determine, based on data received from the vehicle moisture sensors, that the requestor spilled fluid onto the seat.

In another example embodiment, the material detection system 114 analyzes whether the requestor computing device 116 is located within a threshold distance of the vehicle computing device 104, even after the requestor has been dropped off and when the vehicle has left or is leaving the destination location. For example, after the transportation request has been completed, the dynamic transportation system 112 may determine the geographic location of the requestor computing device 116, determine the geographic location of the vehicle computing device 104, compare the geographic locations, and determine that the requestor computing device is within a threshold distance of the vehicle computing device. Similarly, the transportation matching system 112 may determine, based on signal strength between the requestor computing device and the vehicle computing device, whether the requestor computing device 116 is within a threshold distance/proximity of the vehicle computing device 104.

In further embodiments, the material detection system 114 analyzes and compares motion data received from the vehicle computing device 104 and requestor computing device 116. The motion data can include accelerometer data, gyroscope data, proximity sensor data, and magnetometer data. The material detection system 114 analyzes the motion data to determine consistencies or disparities in the motion of the vehicle computing device 104 and requestor computing device 116. For instance, material detection system 114 can determine and compare the acceleration, speed, and/or rotation of the vehicle computing device 104 with the acceleration, speed, and/or rotation of the requestor computing device 116 to determine whether the two devices are moving in similar ways. Furthermore, the material detection system 114 can analyze the motion data received from the requestor computing device 116 to identify an activity/setting consistent with the motion. For example, the material detection system 114 can analyze the motion data to determine whether the motion indicates that the requestor computing device 116 is in a vehicle, is in a person's possession while walking, is being held in a person's hand, etc. In some embodiments, the material detection system 114 utilizes a trained classifier (e.g., a machine learning model trained using a training dataset of previously classified motion data) to analyze and classify the motion data as pertaining to a particular activity or setting.

Further illustrated in FIG. 2, the material detection system 114 may determine that material has been left in the vehicle 212. As part of step 212, the material detection system 114 determines, based on the received data, characteristics of the vehicle interior, including whether or not material has been left in the vehicle. Additionally, the material detection system 114 may aggregate the data received in order to determine material attributes. For example, the material detection system 114 may further determine a type of the material (e.g., mobile device, bag, trash, fluid) and/or a quantity of material (e.g., how many/much of each type of material) left in the vehicle.

As part of step 212, in some embodiments, the material detection system 114 determines that material has been left in the vehicle if any of the collected data indicates the presence of material in the vehicle. In further embodiments, the material detection system 114 calculates a confidence score indicating a likelihood/probability that material has been left in the vehicle. The material detection system 114 can use various methods to calculate the confidence score. For example, the material detection system 114 may consider and/or sum the number of different pieces or types of collected data that indicate material has been left in the vehicle. For example, if only one type of collected data indicates that material has been left in the vehicle, the material detection system 114 might calculate a relatively low confidence score. In contrast, if several different types of data indicate the possible presence of material left in the vehicle, the material detection system 114 might calculate a relatively high confidence score. Furthermore, in calculating the confidence score, in some embodiments, the material detection system 114 weights different types of data differently. For example, if a particular type of data has been shown to be particularly reliable in detecting the presence of material left in a vehicle, the material detection system 114 might apply a relatively higher weight to that particular type of data when calculating the confidence score than is applied to another type of data that has been shown to be less reliable in detecting the presence of material left in a vehicle. This weighting may also be dependent on the type of detected material if certain types of collected data are better and detecting the presence of one type of material than another type of material. To illustrate, while moisture sensors may be more reliable than a camera in detecting a fluid spill, they might be less reliable than a camera in detecting the presence of a personal item left on the seat. Furthermore, the material detection system 114 may use machine learning models that take the collected data as an input and output a confidence score indicating the likelihood of material left in the vehicle.

As illustrated in FIG. 2, the material detection system 114 may identify and perform an action 214 for handling the material left in the vehicle (e.g., based on one or more attributes of the detected material). The material detection system 114 may perform a single or multiple actions for handling the detected material. For example, in some embodiments, material detection system 114 cancels a subsequent transportation request matched to the vehicle subsystem 102 or prevents a subsequent transportation request from being matched to the vehicle subsystem 102, as shown in step 216. By canceling/preventing subsequent transportation requests, the material detection system 114 avoids the cancellation entirely or limits the detrimental effect of the cancellation on the overall efficiency of the dynamic transportation matching system 112.

Additionally, in some embodiments, the material detection system 114 initiates one or more communications 218 (e.g., phone calls, messages, and/or email) with the requestor computing device 116 or vehicle computing device 104. In instances where the material detection system 114 determines that material left in the vehicle does not include the requestor computing device 116, the material detection system 114 may initiate communication with the requestor computing device 116 to notify the requestor that something was left in the vehicle and to provide instructions for recovering the requestor's property. Additionally, the material detection system 114 might initiate a communication to the vehicle computing device 104 to inform a provider or instruct the vehicle subsystem 102 to return to the dropoff location so that the requestor can recover his/her items.

In cases where the material detection system 114 determines that initiating communication with the requestor computing device 116 is ineffective (e.g., when the requestor has left the requestor computing device 116 in the vehicle or when initial attempts at communication are unsuccessful), the material detection system 114 may also initiate communication with alternative computing devices. For example, the material detection system 114 might initiate a communication with an emergency contact associated with the requestor computing device 116 (e.g., as stored in a profile for the requestor), with a companion traveling with the requestor (e.g., based on the companion being tagged in the transportation request, based on the cost of the transportation request being split with the companion, or based on communication signals received by the vehicle computing device 104 from the companion's computing device while the requestor is in the vehicle), or with a third-party system (e.g., a Public Announcement system or security system) associated with the dropoff location. Accordingly, the material detection system 114 attempts to contact the requestor indirectly through computing devices/systems other than the requestor computing device 116. The material detection system 114 may also initiate communication with an alternative computing device associated with the requestor. For example, the system may send an email to an address associated with the requestor if the system determines that the requestor left the requestor computing device 116 in the vehicle.

In further embodiments, as part of performing an action 214, the material detection system 114 sends one or more notifications 220 associated with the detected material. For example, the material detection system 114 can initiate one or more push notifications to the requestor computing device 116 and/or vehicle computing device 104 notifying the requestor and/or provider that the material has been left in the vehicle. In some embodiments, the provided notifications include an indication that material has been left in the vehicle, and instructions for the vehicle subsystem 102 and/or requestor to facilitate return of the material to the requestor.

In some embodiments, as part of performing step 214, the material detection system 114 dispatches the vehicle subsystem 102 to a location to facilitate handling the material left by the requestor. More specifically, the material detection system 114 may dispatch vehicle subsystem 102 (e.g., by sending instructions to the vehicle computing device 104) to the dropoff location associated with the transportation request, to a detected location of the requestor computing device 116, to a service station (e.g., to clean up the material if the material includes trash or fluids, or to store the material in a lost and found for later pickup by the requestor). To illustrate, if the detected material includes a personal item, such as a bag or purse, the material detection system 114 might dispatch the vehicle subsystem 102 to a current location of the requestor computing device to return the personal item to the requestor. In conjunction with this, the material detection system 114 might also initiate one or more communications with the requestor computing device 116 to inform the requestor of and/or provide directions to a location to pick up the personal item. As another example, if the material detection system 114 determines that the material is a spilled drink, bodily fluid, or some other material that requires cleanup, the material detection system 114 might dispatch the vehicle subsystem 102 to a service station that specializes in handling the detected material (e.g., a detail shop that can clean the vehicle). If attempts to directly return a personal item to a requestor are unsuccessful, the material detection system 114 might dispatch the vehicle subsystem 102 to a service station that serves as lost and found storage of personal items. In situations where the vehicle subsystem 102 is autonomous, the material detection system 114 might also take the vehicle subsystem 102 out of service (e.g., for cleaning) and place another vehicle into service to replace the vehicle subsystem 102 within a network of available vehicles.

In additional embodiments, as part of step 214, the material detection system 114 causes the vehicle subsystem 102 to emit a sound 224. For example, the material detection system 114 may cause the vehicle subsystem 102 to emit an internal sound to alert a driver or emit an external sound (e.g., beep, horn, recorded voice message) to alert the requestor that material has been left in the vehicle. In addition to causing the vehicle subsystem 102 to emit a sound, the material detection system 114 might also cause the vehicle subsystem 102 to perform other actions, such as flashing one or more lights, to attract the requestor's attention.

Figure 3:
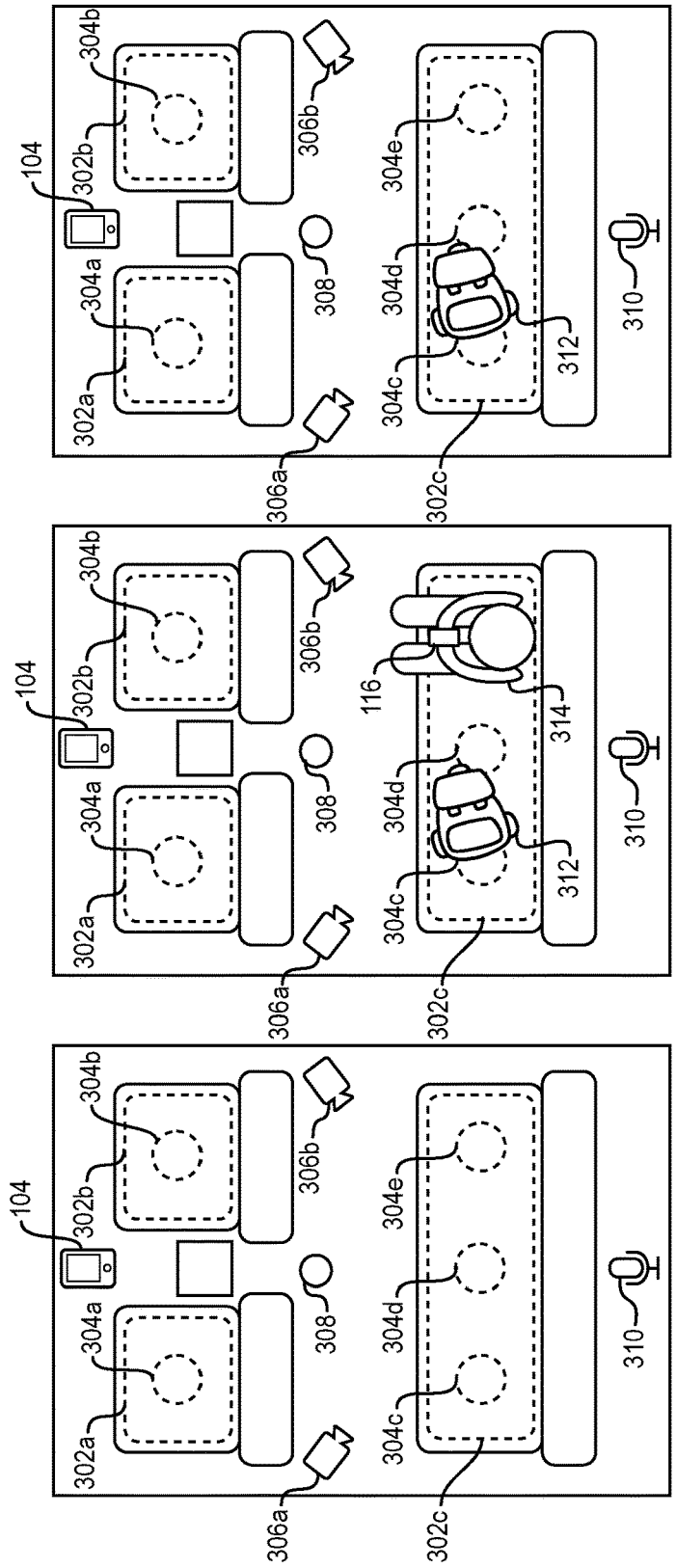
FIGS. 3A-3C illustrate a plurality sensors associated with a vehicle detecting that material has been left in the vehicle, in accordance with an embodiment of the present techniques.

FIGS. 3A-3C illustrate a plurality of sensors associated with a vehicle detecting that material has been left in the vehicle, in accordance with an embodiment of the present techniques. FIG. 3A depicts the example vehicle interior before the vehicle has picked up the requestor associated with the requestor computing device 116. FIG. 3B illustrates the example vehicle interior after the requestor has been picked up by the vehicle and before the vehicle computing device 104 reaches the destination location. Finally, FIG. 3C illustrates the example vehicle interior when the requestor associated with the requestor computing device 116 has left the vehicle at the destination location. The vehicle may contain additional vehicle sensors not illustrated. Additionally, vehicle sensors may be placed in alternative locations than those illustrated in FIGS. 3A-3C.

As used herein, the term "data output" refers to any set of data. In particular, data output refers to data received by the material detection system. Data output may include data from the plurality of vehicle sensors, the requestor computing device, and the vehicle computing device. Data output may refer to data associated with different times during transportation of a requestor. For example, a first data output refers to data associated with the vehicle before the requestor entered the vehicle. Thus, the first data output might be a baseline data set that is associated with vehicle characteristics when the vehicle is empty. A second data output might refer to data associated with the vehicle and computing devices when the requestor has entered the vehicle. A third data output might refer to data associated with the vehicle when the requestor has left the vehicle at the destination location.

Relatedly, the term "predicted characteristics" refers to any characteristics predicted by the material detection system 114. In particular, predicted characteristics refer to characteristics as determined by the material detection system based on the data output. More specifically, predicted characteristics refer to determinations regarding whether or not material has been left in the vehicle based on whether or not the data output indicate material left in the vehicle. For example, if pressure sensors 302 detect pressure in the vehicle, the material detection system may determine a predicted characteristic that the vehicle contains material. More specifically, the material detection system may determine that the vehicle contains material that is applying pressure to the pressure sensors. Alternatively, if none of the vehicle sensors send data that reflects a threshold difference from the first data output (i.e., the baseline data output), the material detection system may determine the predicted characteristic that no material has been left in the vehicle.

FIGS. 3A-3C, respectively illustrate schematic diagrams of the interior of an example vehicle before, during, and after transportation of a requestor. FIG. 3A illustrates a plurality of vehicle sensors before the requestor has entered the vehicle. As shown in FIG. 3A, the vehicle interior includes vehicle computing device 104 and vehicle sensors including moisture sensors 302a-302c (collectively, "moisture sensors 302"), pressure (or weight) sensors 304a-304e (collectively, "pressure sensors 304"), cameras 306a-306b (collectively, "cameras 306"), olfactory sensor 308, and audio sensor 310. In some embodiments, the vehicle computing device 104 receives data from the vehicle sensors. The vehicle computing device 104 may send data from the vehicle sensors to the dynamic transportation matching system 112 and/or the material detection system 114. Additionally, the vehicle computing device 104 may determine to store the sensor data on the vehicle computing device 104, material detection system 114, and/or the dynamic transportation matching system 112. Although illustrated as a mobile device, in some embodiments, the vehicle computing device 104 is integrated into the vehicle. The vehicle computing device 104 will be discussed in further detail below with regard to FIG. 4.

As illustrated in FIG. 3A, the example vehicle interior includes moisture sensors 302a-302c. The moisture sensors 302 may include a microcontroller, transceiver, external memory, power source, and/or one or more moisture sensing elements. In at least one embodiment, the sensing elements sense physical characteristics, such as moisture content, from the vehicle environment and represent the senses moisture content with digitalized moisture data. The moisture sensing elements may send the digitalized moisture data to the microcontroller. The microcontroller may determine to store the moisture data on external memory located on the vehicle computing device 104, as a part of moisture sensor 304, and/or as part of material detection system 114. As illustrated in FIG. 3A, the moisture sensors 302 may collect moisture data associated with the vehicle before the requestor has entered the vehicle. The moisture data collected and sent by moisture sensors 302 becomes the baseline for moisture data. Though the moisture sensors 302 are located in the vehicle seats in FIG. 3A, in at least one embodiment, moisture sensors 302 are located in other areas of the vehicle including the vehicle floor. Moisture sensors are especially helpful in determining whether liquid material has been left in the vehicle. For example, moisture sensors may detect the presence of body fluids, a spilled drink, or other liquids that the material detection system 114 may determine require cleanup at a service station.

Further illustrated in FIG. 3A, the example vehicle interior includes pressure sensors 304a-304e. Pressure sensors 304 may include microcontroller, transceiver, external memory, power source, and/or one or more pressure sensing elements. The pressure sensing elements capture physical pressure data, and convert the physical data into digitalized pressure data. For example, the pressure sensors 304 can collect pressure data and/or send the pressure data to the vehicle computing device 104 and/or the material detection system 114. More specifically as illustrated in FIG. 3A, the pressure sensors 302 collect pressure data to serve as baseline associated with the empty vehicle before the requestor has entered the vehicle. Pressure sensors 304 may help the material detection system 114 determine certain qualities of the material left in the vehicle. For example pressure sensors 304 may help indicate the location of material in the vehicle, weight, and quantity.

FIG. 3A also illustrates cameras 306a-306b. Cameras 306 may include visible image sensors, thermos-image sensors (e.g., infrared sensors), image processors, etc. As illustrated in FIG. 3A, the vehicle contains cameras 306—one on the right side of the vehicle and one on the left side of the vehicle. In at least one embodiment, the cameras 306 may be mounted in different locations within the vehicle. For example, the image sensors may be mounted on the ceiling of the vehicle. Cameras 306 may send and/or store image data. Alternatively, cameras 306 may send image data to the vehicle computing device 104 and/or material detection system 114. As illustrated in FIG. 3A, cameras 306 collect and send image data from the vehicle before the requestor has entered the vehicle. Image data may be used by the material detection system 114 to determine whether any material has been left in the vehicle. Furthermore, the material detection system 114 can utilize the images to "learn" the empty interior of the vehicle, so as to later compare the learned interior to the captured interior after a requestor has left the vehicle. Additionally, the material detection system 114 can utilize image data to detect the presence and/or characteristics of objects within the vehicle (e.g., using one or more object detection algorithms).

FIG. 3A also illustrates an example vehicle that contains more than one camera 306. The material detection system 114 may compile images from the multiple cameras to create composite image data representative of the interior of the vehicle. Composite image data may allow the material detection system 114 to predict with more accuracy the presence of material in the vehicle.

As further illustrated in FIG. 3A, vehicle sensors 108 may include olfactory sensor 308. Olfactory sensor 308 may include one or more scent sensing elements, microcontroller, transceiver, external memory, and a power source. Olfactory sensor 308 may detect impurities or substances within the air of the interior of the vehicle, which the material detection system 114 can use to determine the presence and/or characteristics of certain materials in the vehicle.

As illustrated in FIG. 3A, vehicle sensors 108 may also include audio sensor 310. Though FIG. 3A includes only a single audio sensor 310, one or more embodiments may include multiple audio sensors located in different areas of the vehicle. Audio sensor 310 may detect material that has been left in the vehicle that emits noise. For example, the audio sensor may detect noise emitted from the requestor computing device.

The example vehicle interior in FIG. 3A is associated with a first data output from the plurality of vehicle sensors 108 to material detection system 114. The first data output from the plurality of vehicle sensors 108 includes data from moisture sensors 302, pressure sensors 304, camera 306, olfactory sensor 308, and audio sensor 310. More specifically, the first data output includes data from the sensors before the requestor has entered the vehicle. The material detection system 114 uses first data output to establish a baseline for comparison with subsequent data outputs to determine whether material has been left in the vehicle. For example, cameras 306 may send image data to the material detection system 114. The material detection system 114 compares subsequent image data to the image data associated with the first data output to determine variations in the images captured by cameras 306. The material detection system 114 may associate variations in image data between subsequent image data with a higher confidence score indicating that likelihood that material has been left in the vehicle.

Turning now to FIG. 3B. This figure illustrates an example vehicle interior when the vehicle has picked up the requestor associated with the requestor computing device. Data collected and sent from the vehicle sensors after the requestor has entered the vehicle makes up the second data output. The material detection system 114 may compare the second data output from the vehicle sensors with the first data output discussed in relation to FIG. 3A in order to identify material that the requestor brought into the vehicle.

The second data output includes data regarding material that the requestor has brought into the vehicle while the vehicle is in transit to the destination location. As illustrated in FIG. 3B, the requestor 314 associated with requestor computing device 116 brought material 312 (e.g., a bag and computing device) into the vehicle. The material detection system may identify differences that reach a threshold value between the second data output and the first data output. More specifically, the vehicle sensors will send, to the material detection system 114, a second data output from the plurality of vehicle sensors. The material detection system 114 may compare the second data output with the first data output and determine differences between the second data output and the first data output.

Vehicle sensors may generate second output data that is different than the first output data once the requestor has entered the vehicle. For example, in FIG. 3B, requestor 314 has entered the vehicle and brought material 312 into the vehicle. Vehicle sensors 108 send second data output to material detection system 114. Because material 312 rests on pressure sensors 304c and 304d, and because the requestor 314 is sitting on pressure sensor 304e, the second data output from pressure sensors 304c, 304d, and 304e will reflect added pressure on the pressure sensing elements. Additionally, the presence of material 312 and requestor 314 in the vehicle cause the second data output from cameras 306a and 306b to reflect added visual elements to the vehicle. Olfactory sensor 308 and audio sensor 310 may also generate second output data consistent with sensing the material 312 and requestor 314 in the vehicle.

The material detection system may determine that differences between the second data output and the first data output meet a threshold value. The material detection system 114 may access the second output data from the vehicle sensors and identify differences between the second data output and the first data output. For example, as illustrated in FIG. 3B, the material detection system 114 may identify a difference between the second data output from pressure sensors 304*c*-304*e* and the first data output from pressure sensors 304*c*-304*e*. Additionally, the material detection system 114 may identify a difference between the second data output from the cameras 306*a* and 306*b* between the first data output and second data output. The material detection system 114 may determine other differences between the first data output and second data output from any of the other vehicle sensors.

FIG. 3C illustrates an example vehicle interior when the vehicle has dropped off the requestor at the destination location. When the dynamic transportation matching system 112 has detected that the requestor has been dropped off at the destination location, the vehicle sensors 108 generate a third data output to send to the material detection system 114. The material detection system 114 compares the third data output with the first data output. In some embodiments, the material detection system 114 may also compare the third data output with the second data output. The material detection system 114 may, depending on identified differences between the data outputs, determine a predicted characteristic that material has been left in the vehicle after the completion of the transportation request. Furthermore, the material detection system 114 may, based on differences of data output, determine one or more attributes of the material from which the material detection system 114 may determine an appropriate action to handle the material.

Vehicle sensors may generate third output data that is different from the first output data and second output data once the requestor has left the vehicle, and the difference may meet a threshold value. For example, as illustrated in FIG. 3C, the requestor is no longer present in the vehicle. Therefore, pressure data output from 304*e* after the requestor has left the vehicle (i.e., third output data) will be more similar to pressure data from 304*e* before the requestor entered the vehicle (e.g., first output data). However, because the material 312 remains on pressure sensors 304*c* and 304*d*, pressure data from sensors 304*c* and 304*d* after the requestor has left the vehicle (i.e., third output data) will be more similar to pressure data from 304*c* and 304*d* after the requestor entered the vehicle (i.e., second output data). Third output data from cameras 306*a* and 306*b* will be different from second output data and first output data from cameras 306*a* and 306*b*. First output data from cameras 306*a* and 306*b* reflected an empty vehicle, second output data from cameras 306*a* and 306*b* reflected material 312 and requestor 314 in the vehicle, and third output data from cameras 306*a* and 306*b* reflected only material 312 in the vehicle. Though not illustrated, third data output from olfactory sensor 308, moisture sensors 302, and audio sensor 310 may also be different from second and first output data from olfactory sensor 308, moisture sensors 302, and audio sensor 310.

Based on differences and/or similarities between the different data outputs from the vehicle sensors, the material detection system 114 may determine that material has been left in the vehicle. More specifically, the material detection system 114 may calculate a confidence score indicating a likelihood that material has been left in the vehicle. In at least one embodiment, the material detection system 114 uses a machine learning model to determine, based on data output from the vehicle sensors, whether material has been left in the vehicle. The machine learning model will be discussed in further detail below in conjunction with FIG. 5.

Figure 4:
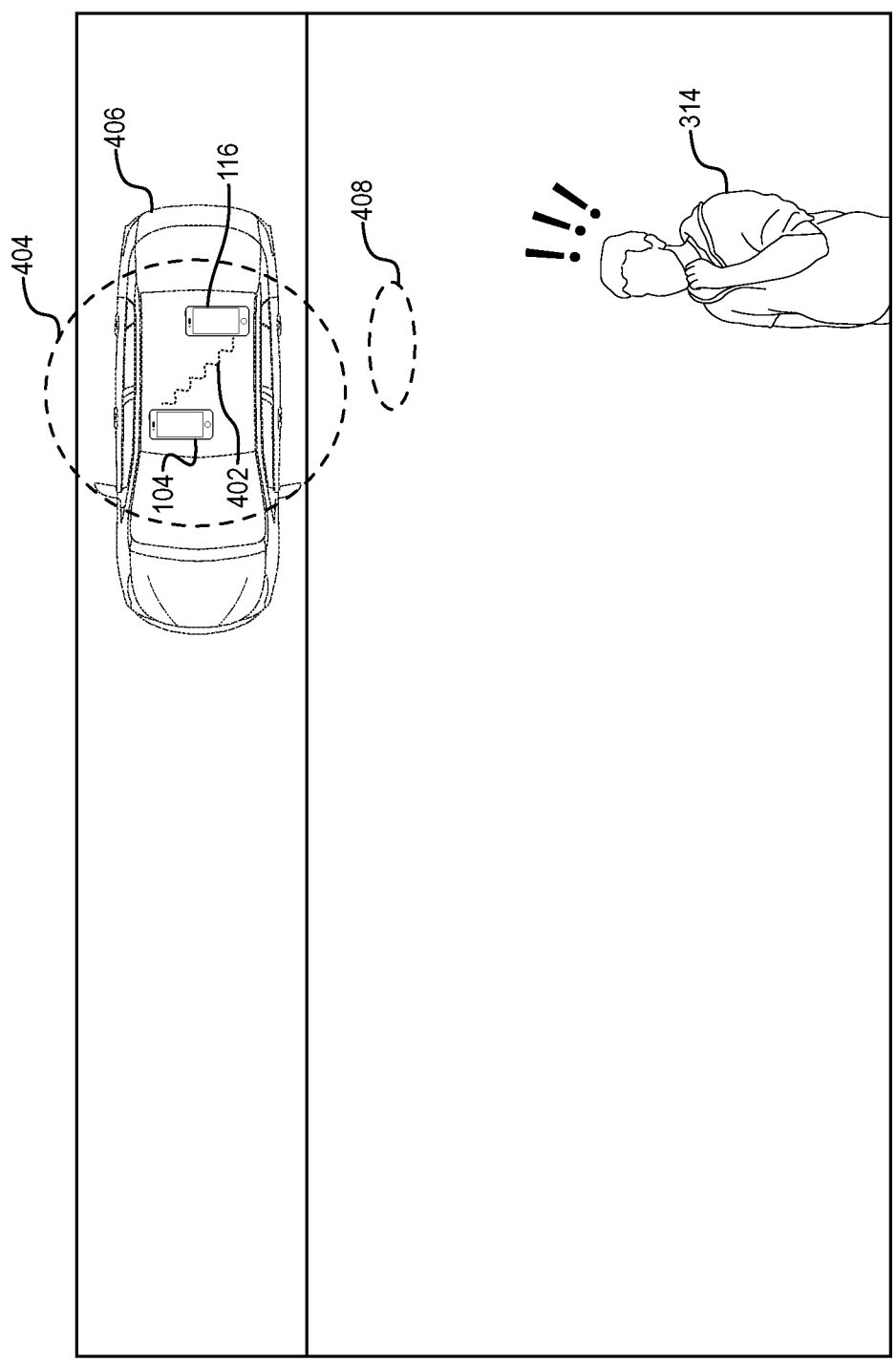
FIG. 4 illustrates an example of the dynamic transportation matching system detecting that a requestor computing device has been left in the vehicle, in accordance with an embodiment.

FIGS. 3A-3C illustrate how the material detection system 114 may determine that material has been left in the vehicle based on data output from vehicle sensors 108. In one or more embodiments, material detection system 114 may also analyze data output from the requestor computing device 116 and vehicle computing device 104 to determine that material has been left in the vehicle, as has been introduced above. FIG. 4 illustrates an example environment in which the material detection system 114 may determine that the requestor computing device has been left in the vehicle based on data output from the requestor computing device and the vehicle computing device.

FIG. 4 illustrates an example of an environment 400 including vehicle 406, vehicle computing device 104, requestor computing device 116, and requestor 314 at destination location 408. In one or more embodiments, the material detection system 114 may determine that a requestor computing device 116 has been left in the vehicle by several methods. In one or more embodiments, the material detection system 114 may analyze data from the vehicle computing device 104 and the requestor computing device 116 to: determine the geographic locations, and based upon geographic locations of the computing devices, determine that they are within a threshold distance of each other; determine a signal strength between the requestor computing device 116 and the vehicle computing device 104, and based upon the signal strength, determine that the computing devices are within a threshold distance of each other; and analyze accelerometer data from the requestor computing device 116 and vehicle computing device 104, and identify similarities or differences between accelerometer data for the computing devices. Each of these embodiments will be described below.

As will be described below, the requestor computing device and the vehicle computing device have location modules that allow the material detection system 114 to access location data for the requestor computing device 116 and the vehicle computing device 104. After accessing the location data for the requestor computing device 116 and the vehicle computing device 104, the material detection system 114 may compare the location data and determine that the requestor computing device 116 is located within a threshold distance 404 of the vehicle computing device 104. The determination that the requestor computing device 116 is located within a threshold distance 404 of the vehicle computing device 104 may be associated with a higher confidence score indicating a likelihood that material has been left in the vehicle and that the material left in the vehicle comprises the requestor computing device.

Material detection system 114 may also use signal strength data to determine that the requestor computing device 116 is located within a threshold distance 404 of vehicle computing device 104. In some embodiments, a vehicle computing device 104 may be configured to communicate directly with a requestor computing device 116 to identify the location of the requestor computing device 116. More specifically, when the requestor computing device 116 is within range of the vehicle computing device 104, the vehicle computing device 104 may receive signals and/or communications 402 from the requestor computing device 116. Stronger signals are generally indicative of a shorter distance between the requestor computing device 116 and the vehicle computing device 104. Material detection system 114 may access signal strength data from vehicle computing device 104 to determine whether requestor computing device 116 is located within a threshold distance 404 of vehicle computing device 104. For example, the vehicle computing device may identify a Bluetooth signal identifier for a 116 requestor computing device and detect the Bluetooth signal strength from the 116 requestor computing device. Additionally, the vehicle computing device 104 may identify Bluetooth signals from other computing devices in the vehicle (e.g., other mobile and/or wearable devices) associated with the requestor computing device 116. Based on the signal strength from the other computing devices, the material detection system 114 may determine that other computing devices have been left in the vehicle.

Material detection system 114 may also utilize accelerometer data to determine a likelihood that the requestor computing device 116 has been left in the vehicle 406 after the requestor 314 has been dropped off at destination location 408. As will be described in additional detail below, vehicle computing device 104 and requestor computing device 116 may be configured to record accelerometer data. Material detection system 114 may access the accelerometer data from the vehicle computing device 104 and the requestor computing device 116. Material detection system 114 may analyze and compare the accelerometer data from the computing devices and identify similarities and/or differences between the data. More similarities correlate with a higher confidence score indicating a likelihood that the requestor computing device 116 has been left in the vehicle.

Additionally, material detection system 114 may utilize interaction data from sensors on the requestor computing device 116 to determine that the requestor computing device 116 has been left in the vehicle. In particular, requestor computing device sensors include touch sensors, computing device cameras, ambient light sensors, or identification sensors. More specifically, if the material detection system may determine that the requestor computing device's touch sensors have detected touch actions and may imply use by the requestor. Therefore, the material detection system 114 might associate touch sensors that report activity with a lower likelihood that the requestor has left the requestor computing device 116 in the vehicle. Additionally, the material detection system may access computing device camera data or ambient light sensors to determine whether the camera data is consistent with the inside of a vehicle or if the data is more consistent with the requestor. For example, the material detection system 114 would consider camera data that reflects that the computing device is located within a pocket or a purse more indicative of the requestor having the requestor computing device 116. Furthermore, the material detection system 114 may use data from identification sensors, such as fingerprint sensors or face recognition sensors, to determine the location of the requestor computing device. For example, activity by the fingerprint sensor or face recognition sensor is indicative that the requestor is using the fingerprint sensor or face recognition sensor; and therefore, the requestor computing device likely has not been left in the vehicle.

The material detection system 114 may aggregate data from the vehicle sensors, the requestor computing device 116, and the vehicle computing device 104, to determine whether material has been left in the vehicle or not. In at least one embodiment, the material detection system 114 calculates a confidence score indicating a likelihood that material has been left in the vehicle.

In order to calculate the confidence score indicating a likelihood that material has been left in the vehicle, the material detection system 114 analyzes data from the plurality of vehicle sensors and the computing devices. In one embodiment, a higher confidence score indicating likelihood that material has been left in the vehicle is associated with a higher number of differences that meet a threshold between, for example, the third data output and the first data output. For example, as illustrated in FIG. 3C, differences that meet a threshold between third data output from pressure sensors 304c and 304d and cameras 306a and 306b and first data output from pressure sensors 304c and 304d and cameras 306a and 306b result in a higher confidence score. On the other hand, if the material detection system 114 does not identify differences that meet a threshold between third data output and first data output from the plurality of vehicle sensors, the material detection system 114 may determine a lower confidence score indicating a lower likelihood that material has been left in the vehicle. Additionally, the system can weight the effect of each type of data on the confidence score based on, for example, a reliability of each type of data in predicting the presence of material in a vehicle, an amount of each type of data, a consistency of multiple sources of data, and a strength of correlation between different types of data and different materials. The system can then use the calculated score to determine whether material has been left in the vehicle (e.g., by comparing the confidence score to a predetermined threshold).

The material detection system 114 may use data output from the plurality of sensors and computing devices not only to determine whether or not material has been left in the vehicle but also to determine material attributes that dictate the appropriate action taken by the material detection system 114 to handle the material left in the vehicle. More specifically, the material detection system may categorize types and quantity of the material based on the sensors that sent varying first data output and third data output. For example, as illustrated in FIG. 3C, the material detection system 114 may determine that the material left in the vehicle is not likely liquid considering that differences between third output data and first output data from moisture sensors 302 did not meet a threshold. Alternatively, if the requestor spilled a drink in the vehicle, the third data output from the moisture sensors 302 may be significantly different than the first data output from the moisture sensors 302. Though the material detection system might in cases of spilled drinks identify differences in moisture sensor data before the requestor left the vehicle and after the requestor left the vehicle, the material detection system may not identify differences in pressure sensor 304, camera 306, and audio 310 sensor data outputs. The material detection system 114 may compile data in which sensor data corresponds to different types and quantities of material left in the vehicle.

Additional detail will now be provided regarding various approaches to training and utilizing a machine learning model in accordance with one or more embodiments of the material detection system 114. In particular, FIG. 5 illustrates training a machine learning model to predict, based on data analysis received from the plurality of vehicle sensors, the requestor computing device, and the vehicle computing device, the likelihood that material has been left in the vehicle.

Figure 5:
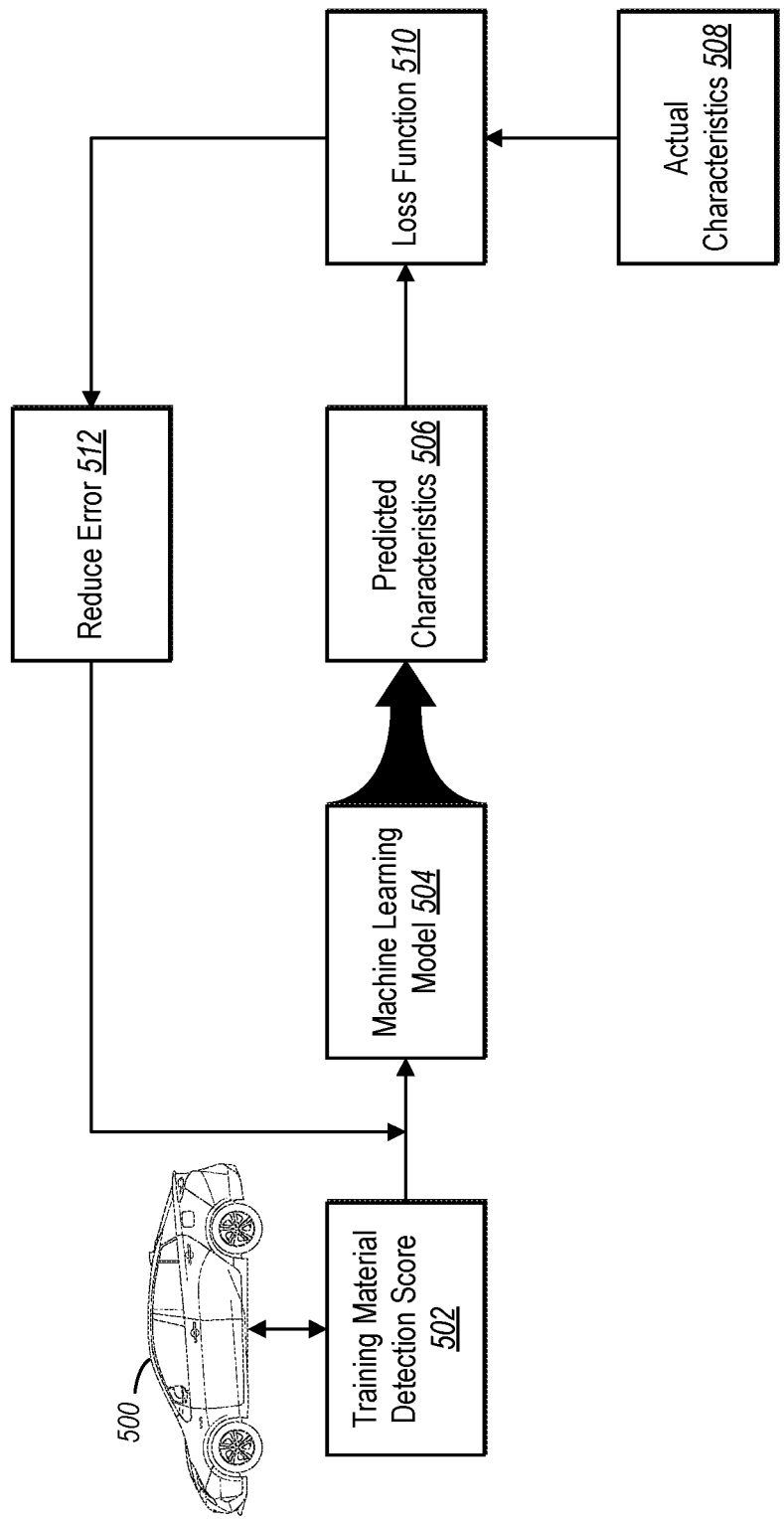
FIG. 5 illustrates an example flow diagram of training a machine learning model in accordance with one or more embodiments.

FIG. 5 illustrates one example of training a machine learning model to predict the likelihood that material has been left in the vehicle in accordance with one or more embodiments of the material detection system 114. In some embodiments, the material detection system 114 trains the machine learning model based of a set of training data. The training data can include subsets of data collected by requestor computing devices, vehicle computing devices, and vehicle sensors, wherein each subset represents a different situation in which material may have been left in a vehicle by a requestor (e.g., including a subset of data for training vehicle subsystem 500). Furthermore, each subset of data may be associated with a corresponding training material detection score (e.g., training material detection score 502 for training vehicle subsystem 500) as well as characteristics associated with the data (e.g., actual characteristics 508 of the training vehicle subsystem 500).

Moreover, as shown in FIG. 5, the material detection system 114 provides the training data to the machine learning model 504. As illustrated, the machine learning model 504 analyzes the training data to generate predicted characteristics 506 and/or calculate a confidence score indicating a likelihood that material has been left in the vehicle. In addition, the material detection system 114 trains the machine learning model 504 by comparing the predicted characteristics 506 and/or confidence score with the actual characteristics 508 and/or training material detection score 502. Specifically, the material detection system 114 performs an act of applying a loss function 510. By applying the loss function, the material detection system 114 determines a measure of loss (e.g., a difference or measure of error) between the actual characteristics 508/training material detection score 502 and the predicted characteristics 506/calculated confidence score. For example, the material detection system 114 may apply any of a number of appropriate loss functions such as a Bayesian loss function, a risk function, a quadratic loss function, or a utility function.

As shown, the material detection system 114 can train the machine learning model 504 based on the determined loss (or error). In particular, the material detection system 114 further performs the act 512 of reducing the error determined by the loss function. For instance, the material detection system 114 can modify parameters of the machine learning model 504 to reduce the difference between the predicted characteristics 506 or confidence score and the actual characteristics 508 or training material detection score 502. To illustrate, in one or more embodiments, the material detection system 114 performs one of a number of error reduction techniques such as mean squared error reduction or standard error reduction.

Furthermore, in one or more embodiments, the material detection system 114 repeats the process illustrated in FIG. 5. Indeed, the material detection system 114 can perform the illustrated steps for each subset of data representing a different vehicle situation. As the material detection system 114 repeats the process illustrated in FIG. 5, the predicted characteristics 506 and corresponding calculated confidence scores become more and more accurate.

Though FIG. 5 illustrates generating predicted characteristics 506 which indicate whether or not material is in the vehicle, other embodiments include machine learning models that train the material detection system to make additional determinations. For example, in at least one embodiment, the machine learning model may determine material attributes in addition to or instead of predicted characteristic 506. More specifically, the machine learning model may, based on training material detection scores 502 that include data output in conjunction with actual material attributes, determine material attributes. Furthermore, the material detection system may utilize machine learning model 504 to determine an appropriate action based on data from the plurality of sensors and computing devices. For example, the machine learning model may generate a predicted appropriate action instead of predicted characteristic 506 by using data output in conjunction with actual appropriate actions.

Figure 6:
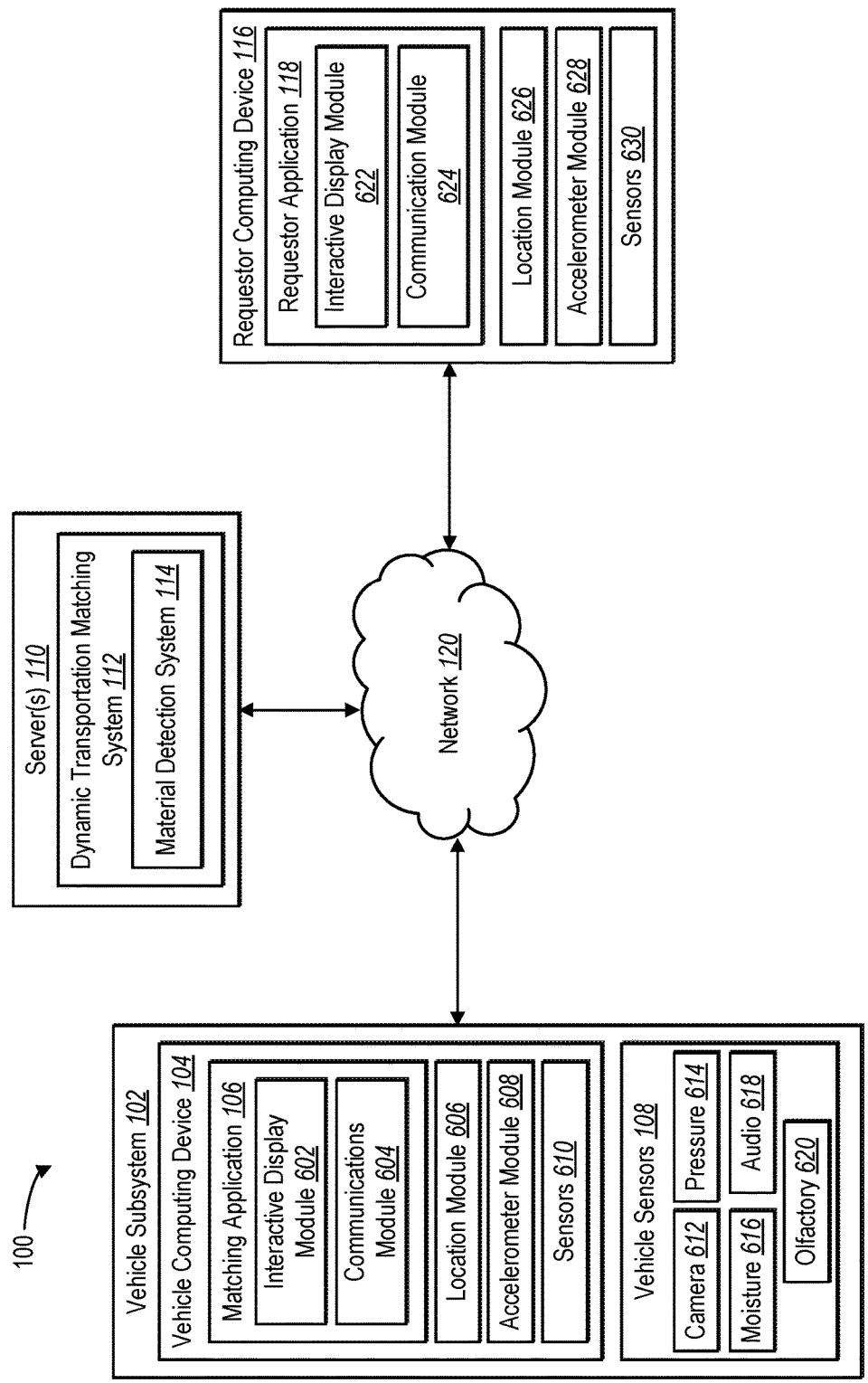
FIG. 6 illustrates a further detailed environmental diagram of a dynamic transportation matching system in accordance with one or more embodiments disclosed herein.

FIG. 6 illustrates the example environment 100 as in FIG. 1 but with additional detail for vehicle subsystem 102 and requestor computing device 116.

FIG. 6, similarly to FIG. 1, illustrates a schematic diagram of an environment 100 for implementing a dynamic transportation matching system 112 in accordance with one or more embodiments disclosed herein.

As discussed in FIG. 1, the transportation application 106 of the vehicle computing device 104 is configured to receive the matched ride information including a destination location from the dynamic transportation matching system 112. In at least one embodiment, the transportation application 106 may include a number of modules including the interactive display module 602 and the communications module 604. These modules will be discussed in additional detail below.

In some embodiments, the interactive display module 602 of the transportation application 106 may be configured to display other types of system information upon particular conditions being met and/or upon instruction from the ride matching system. For example, the interactive display module may be configured to display provider information including driver metrics (e.g., miles driven, amount earned, status towards a reward, etc.), notifications when material has been left in the vehicle, and/or any other relevant information to the provider. The interactive display module 602 may be configured to receive the information and/or monitor the provider information for conditions that may be trigger the presentation of such information. For example, when the requestor leaves an item or material in the vehicle after the requestor has left the vehicle at the destination location, the interactive display module 602 may be configured to display such a notice to the provider through a provider communication device in line with the description herein. Accordingly, the interactive display module 602 may be configured to present a variety of different types of information through a display on the vehicle computing device and/or a display on the vehicle computing device 104.

The communications module 604 of the vehicle computing device may include one or more transceivers that are configured to communicate with the requestor computing device 116. The communications module 604 of the vehicle computing device 104 may be similarly configured to receive a requestor communication identifier and communicate with a communications module 228 of a requestor computing device 114. For example, the provider communication device 104 may receive the requestor communication identifier from the vehicle computing device 104 and use the requestor communication identifier to identify signals received from a requestor computing device 114. The communications module 204 of the vehicle computing device 104 may determine signal strengths of signals received from the requestor computing device 116 and report the signal strengths to the vehicle computing device 104 when the requestor computing device is within a threshold distance from the vehicle computing device. Additionally, in some embodiments, a variety of vehicle computing devices may be located throughout a vehicle computing device and may report signal strength readings to the vehicle computing device for determination of proximity of the requestor computing device. In some embodiments, the variety of provider communication devices 104 located throughout the provider vehicle may have a communications module 204 without the corresponding displays in order to minimize the size and/or footprint of the devices placed throughout the vehicle.

Requestor computing device 116 may also contain communications module 628 similar to communications module 604 of the vehicle computing device. As described above with regard to vehicle computing device communications module 604, the requestor computing device communications module 628 may include one or more transceivers that are configured to communicate with the vehicle computing device 104. The communications module 628 may communicate signal strength data to the requestor computing device 116, which in turn report the signal strength data to the material detection system 114. The material detection system 114 may then determine, using data from the communication module 604 associated with the vehicle computing device 104 and the communication module 628 associated with the requestor computing device 116 that the computing devices are located within a threshold distance of each other.

In addition to the modules located on the transportation application 106, the vehicle computing device 104 may also contain a number of modules. In some embodiments, the vehicle computing device 104 may contain location module 606 and accelerometer module 608. These modules will be discussed below.

As illustrated in FIG. 6, vehicle computing device 104 may contain location module 606. The location module 606 may track the location of the vehicle computing device 104 using any suitable technology. For example, the location module may include a GPS transceiver, network triangulation components, and/or any other suitable technology to identify the present location of the vehicle computing device. The location module 606 may provide location data associated with the location of the vehicle computing device 104 to the vehicle computing device 104. Vehicle computing device 104 may use the vehicle location data to determine the location of the vehicle computing device, report to the dynamic transportation matching system 112, and/or use by the material detection system 114.

Similarly, the requestor computing device 116 may also contain a location module 230. Location module 230 may track the location of the requestor computing device 114 using any suitable technology. The location module 230 may provide the location of the requestor computing device 104 to the material detection system 114 and/or the dynamic transportation matching system 112.

In some embodiments, the material detection system 114 may use information from the location module 206 located on the vehicle computing device 104 and the location module 630 located on the requestor computing device 116 to determine when the vehicle computing device 104 is located within a threshold distance from the requestor computing device 116. The material detection system 114 may determine the geographical distance between the vehicle computing device 104 and the requestor computing device 116. For example, when location data and other data indicate that the vehicle computing device 104 has begun to leave the destination location, the material detection system 114 may access location data from the vehicle location module 606 and the requestor location module 630. Based on the location data, the material detection system 114 may determine that vehicle computing device 104 and the requestor computing device 116 are located within a threshold distance of each other. The material detection system 114 may associate the determination that the vehicle computing device 104 and requestor computing device 116 are located within a threshold distance of each other with a higher confidence score indicating a likelihood that the requestor computing device 116 has been left in the vehicle.

As illustrated in FIG. 6, vehicle computing device 104 may also contain accelerometer module 608. The accelerometer module 608 may track accelerometer data of the vehicle computing device 104 using any suitable technology. For example, the accelerometer module 608 may include motion sensors, orientation sensors, and/or any other suitable technology to identify acceleration data associated with the vehicle computing device 104. The accelerometer module 608 may provide acceleration data associated with the vehicle computing device 104 for use of determining similar acceleration characteristics with the requestor computing device 116 by the material detection system 114.

Requestor application 118 located on requestor computing device 116 may also contain an accelerometer module 632 similar to accelerometer module 608 located on the vehicle computing device 104. The accelerometer module 632 may function in a similar manner to the accelerometer module 608 described above. The accelerometer module 632 may send accelerometer data to the requestor client device 116 to send to the material detection system 114. The material detection system 114 may use data from the requestor accelerometer module 232 and the vehicle accelerometer module 208 to determine whether the vehicle computing device 104 and requestor computing device 116 have the same or similar accelerometer data. Based on receiving similar accelerometer data, the material detection system 114 may associate similar accelerometer data with a higher confidence score indicating a likelihood that the requestor computing device has been left in the vehicle. Additionally, the material detection system may determine that the requestor computing device is likely with the requestor if accelerometer data is more consistent with a walking person instead of a driving car.

As illustrated in FIG. 6, vehicle computing device 105 contains sensors 610, and requestor computing device 116 also contains sensors 360. Sensors on the vehicle computing device 105 and the requestor computing device 116 function in a similar manner. Sensors may include touch sensors, cameras, ambient light sensors, and identification sensors (e.g., fingerprint sensors and face detection technology). Specifically, material detection system 114 accesses data from sensors 630 associated with the requestor computing device 116. Material detection system 114 may determine whether data from sensors 630 are consistent with the requestor computing device being left in the vehicle (e.g., image data that is consistent with the vehicle's interior) or the requestor computing device being with the requestor (e.g., image data that is consistent with the inside of a requestor's bag or pocket). Additionally, the system may determine that the requestor computing device has not been left in the vehicle and is instead with the requestor if the system determines that data from computing device sensors indicates that the requestor is using the computing device. For example, the computing device may detect interaction with identification sensors and/or touch sensors of the computing device.

Vehicle subsystem 102 may also include vehicle sensors 108. Some embodiments may include the following sensors: camera 614, pressure sensor 616, moisture sensor 618, audio sensor 820, and olfactory sensor 822. Vehicle sensors 108 send data to the vehicle computing device 104. The vehicle computing device 104 sends sensor data to the material detection system 114. The vehicle sensors 108 have been described in detail above with regard to FIGS. 3A-3C.

Figure 7:
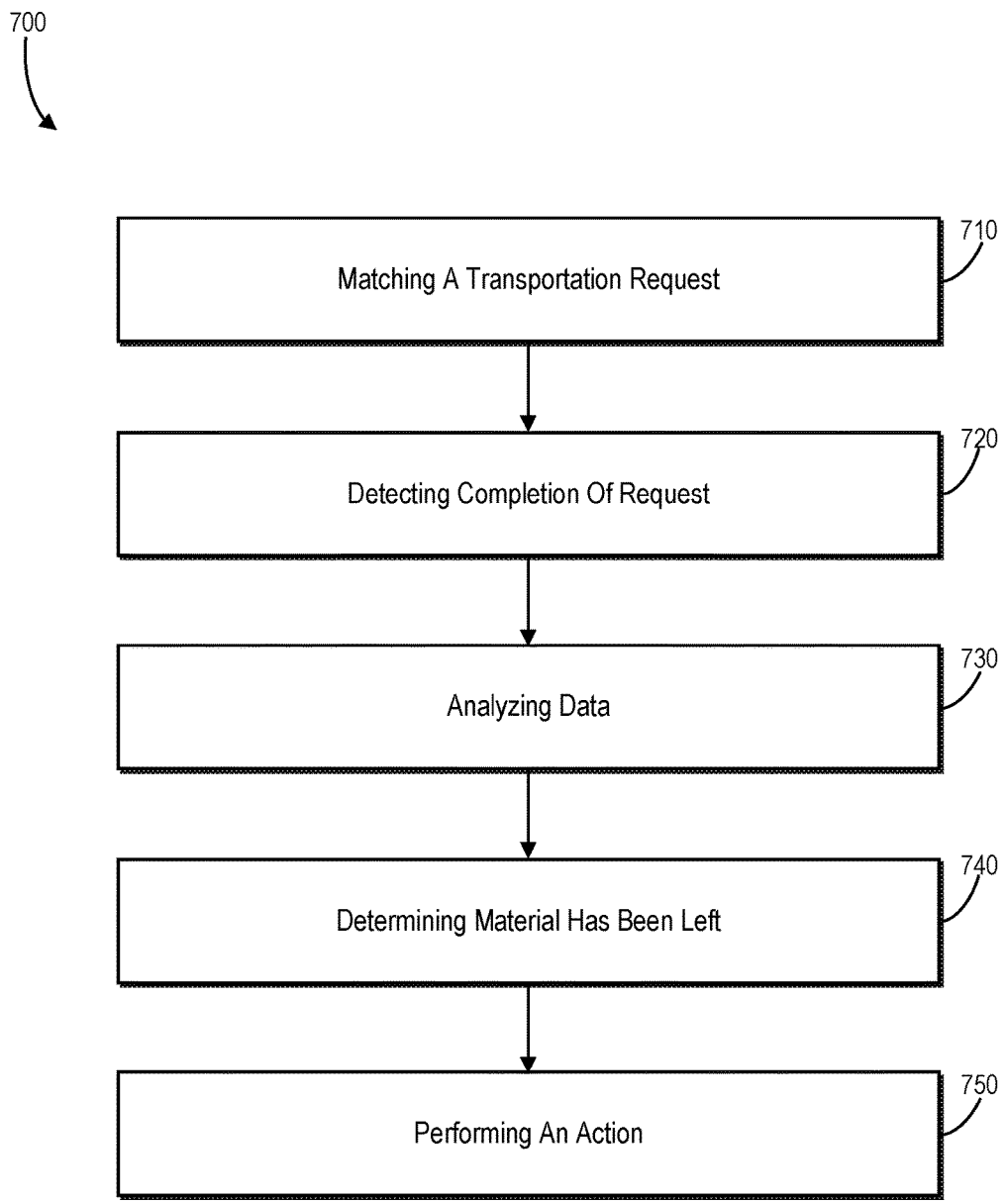
FIG. 7 illustrates a flowchart of a series of acts in a method of determining that material has been left in the vehicle in accordance with one or more embodiments.

Turning now to FIG. 7, this figure illustrates a flowchart of a series of acts 700 of using data from a plurality of sources to determine that material has been left in the vehicle and perform an appropriate action to handle the material. While FIG. 7 illustrates acts according to one embodiment, alternative embodiments may omit, add to, reorder and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 600 include an act 710 of matching a transportation request. In particular, the act 710 includes matching, by a dynamic transportation matching system, a transportation request received from a requestor computing device with a computing device associated with a vehicle. In some such embodiments, matching a transportation request received from a requestor computing device with a computing device associated with a vehicle requires a dynamic transportation matching system to receive a transportation request which may include information comprising a pick up location and destination location from a requestor computing device. The transportation matching system may match the transportation request with a vehicle computing device.

As further shown in FIG. 7, the acts 700 include an act 620 of detecting completion of the request. In particular, the act 720 includes detecting, by the dynamic transportation matching system, completion of the transportation request. For example, in some embodiments, detecting completion of the transportation request comprises receiving, from the computing device associated with the vehicle, an indication that a requestor associated with the requestor computing device has been dropped off at a destination location.

As further shown in FIG. 7, the acts 700 may include an act 730 of analyzing data. In particular, the act 730 includes analyzing data from a plurality of sensors associated with the vehicle, from the computing device associated with the vehicle, and from the requestor computing device. In certain embodiments, the plurality of sensors comprise one or more cameras, one or more audio sensors, one or more pressure sensors, one or more moisture sensors, and one or more olfactory sensors.

For example, in some embodiments, analyzing the data comprises: determining a geographic location of the requestor computing device after completion of the transportation request; determining a geographic location of the computing device associated with the vehicle after completion of the transportation request; and comparing the geographic location of the requestor computing device to the geographic location of the computing device associated with the vehicle to determine whether the requestor computing device is within a threshold distance of the computing device associated with the vehicle.

Relatedly, in some embodiments, analyzing the data comprises: determining a signal strength between the requestor computing device and the computing device associated with the vehicle; and determining, based on the signal strength, whether the requestor computing device is within a threshold distance of the computing device associated with the vehicle. For example, the material detection system may determine Bluetooth signal strength from the requestor computing device to the vehicle computing device.

Additionally, in certain embodiments, analyzing the data comprises: analyzing accelerometer data from the requestor computing device; analyzing accelerometer data from the computing device associated with the vehicle; and identifying similarities between the accelerometer data from the requestor computing device and the accelerometer data from the computing device associated with the vehicle.

As further shown in FIG. 7, acts 700 include an act 740 of determining material has been left. In particular, the act 740 includes determining, based on the data analysis, that material has been left in the vehicle after the completion of the transportation request. For example, in certain embodiments, determining that material has been left comprises calculating, based on the data analysis, a confidence score indicating a likelihood that the material has been left in the vehicle.

As further shown in FIG. 7, acts 700 include an act 750 of performing an action. In particular, the act 750 includes performing an action for handling the material left in the vehicle based on one or more attributes of the material.

For example, in some embodiments, act 750 of performing the action includes determining the one or more attributes of the materials based on the data analysis, wherein the one or more attributes comprise a type of material or a quantity of material.

Relatedly, in some embodiments, act 750 of performing the action includes utilizing the one or more attributes to identify an appropriate action for handling the material left in the vehicle.

Additionally, in certain embodiments, act 750 of performing the action, the appropriate action comprises at least one of: cancelling a subsequent transportation request matched to the computing device associated with the vehicle; initiating a communication with the computing device associated with the vehicle; initiating a communication with the requestor computing device; initiating a communication with an alternative computing device associated with the requestor; sending a notification to the requestor computing device; sending a notification to the computing device associated with the vehicle; dispatching the computing device associated with the vehicle to a drop off location associated with the transportation request; dispatching the computing device to a location of the requestor computing device; initiating a phone call to an emergency contact associated with the requestor computing device; causing the vehicle to emit a sound; sending a message regarding the material left in the vehicle to a third party system associated with the drop off location; initiating a communication with a companion computing device associated with the requestor computing device; and dispatching the computing device associated with the vehicle to a service station.

In certain embodiments, act 750 of performing an action includes the following additional steps: determining that the action was ineffective in handling the material left in the vehicle; in response to determining that the action was ineffective, performing a second action for handling the material left in the vehicle.

Figure 8:
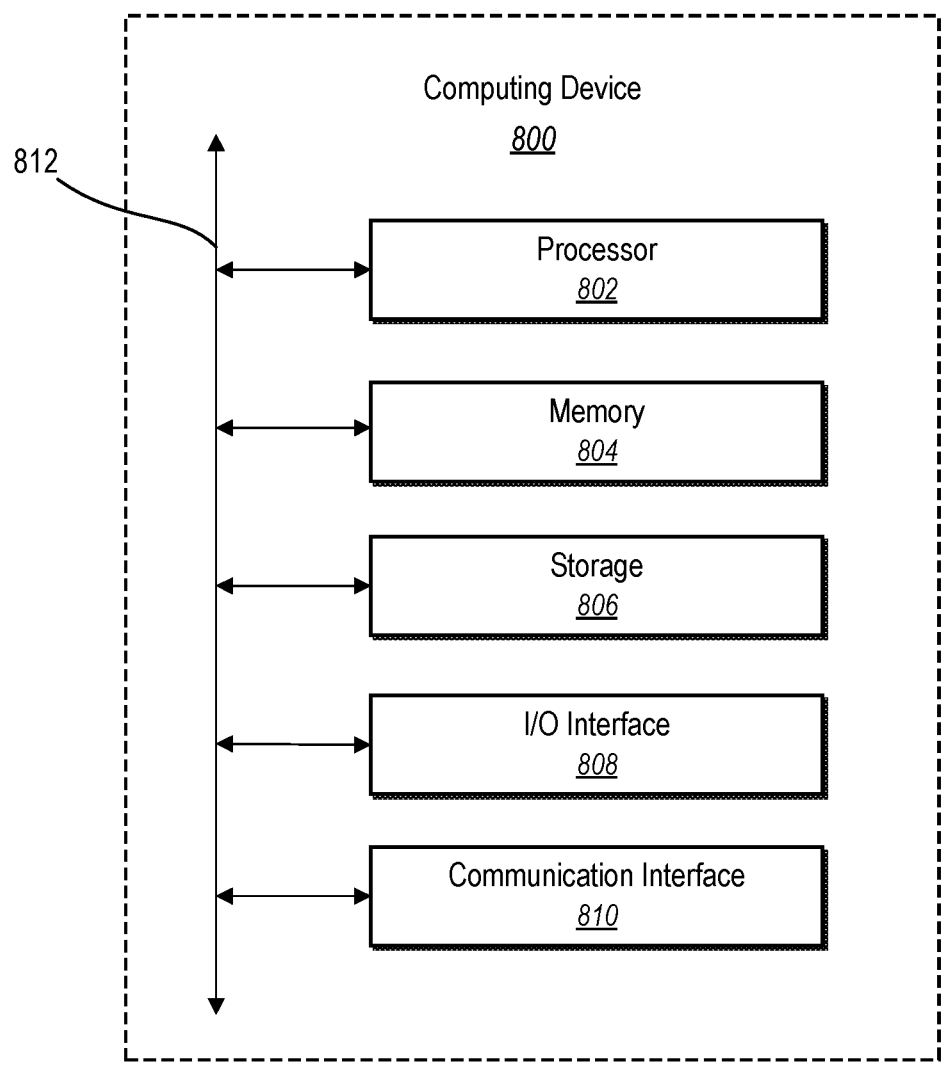
FIG. 8 illustrates a block diagram of an exemplary computing device in accordance with one or more embodiments.

FIG. 8 illustrates, in block diagram form, an exemplary computing device 800 that can be configured to perform one or more of the processes described above. One will appreciate that the transportation system 102 can comprise implementations of the computing device 800, including, but not limited to, the server(s) 104, the rider computing devices 106a-106b, and the driver computing devices 108a-108b. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

For instance embodiments, processor(s) 802 includes hardware for executing instructions, such as those making up a computer program. As an example, and not by way of limitation, to execute instructions, processor(s) 802 can retrieve (or fetch) the instructions from an internal register, an internal cache, memory 804, or a storage device 806 and decode and execute them.

The computing device 800 includes memory 804, which is coupled to the processor(s) 802. The memory 804 can be used for storing data, metadata, and programs for execution by the processor(s). The memory 804 can include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 can be internal or distributed memory.

The computing device 800 includes a storage device 806 includes storage for storing data or instructions. As an example, and not by way of limitation, storage device 806 can comprise a non-transitory storage medium described above. The storage device 806 can include a hard disk drive ("HDD"), flash memory, a Universal Serial Bus ("USB") drive or a combination of these or other storage devices.

The computing device 800 also includes one or more input or output ("I/O") interface 808, which are provided to allow a user (e.g., requestor or provider) to provide input to (such as user strokes), receive output from, and otherwise transfer data to and from the computing device 800. These I/O interface 808 can include a mouse, keypad or a keyboard, a touch screen, camera, optical scanner, network interface, modem, other known I/O devices or a combination of such I/O interface 808. The touch screen can be activated with a stylus or a finger.

The I/O interface 808 can include one or more devices for presenting output to a user, including, but not limited to, a graphics engine, a display (e.g., a display screen), one or more output providers (e.g., display providers), one or more audio speakers, and one or more audio providers. In certain embodiments, interface 808 is configured to provide graphical data to a display for presentation to a user. The graphical data can be representative of one or more graphical user interfaces and/or any other graphical content as can serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 can include a network interface controller ("NIC") or network adapter for communicating with an Ethernet or other wire-based network or a wireless NIC ("WNIC") or wireless adapter for communicating with a wireless network, such as a WI-FI. The computing device 800 can further include a bus 812. The bus 812 can comprise hardware, software, or both that couples components of computing device 800 to each other.

Figure 9:
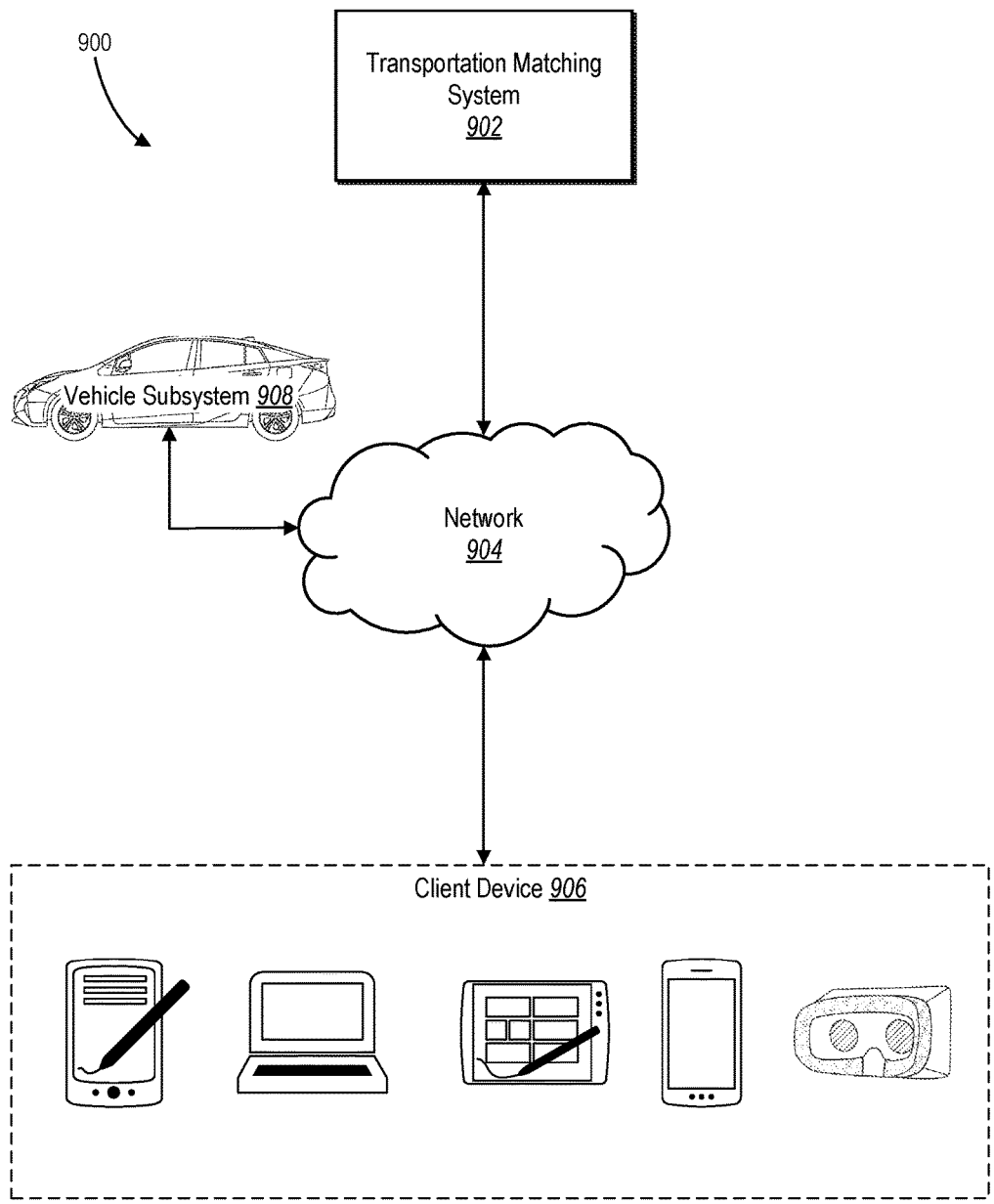
FIG. 9 illustrates an example environment for a transportation system in accordance with one or more embodiments.

FIG. 9 illustrates an example network environment 900 of a dynamic transportation system. The network environment 900 includes a client device 906, a transportation system 902, and a vehicle subsystem 908 connected to each other by a network 904. Although FIG. 9 illustrates a particular arrangement of the client device 906, dynamic transportation system 902, vehicle subsystem 908, and network 904, this disclosure contemplates any suitable arrangement of client device 906, dynamic transportation system 902, vehicle subsystem 908, and network 904. As an example, and not by way of limitation, two or more of client device 906, dynamic transportation system 902, and vehicle subsystem 908 communicate directly, bypassing network 904. As another example, two or more of client device 906, dynamic transportation system 902, and vehicle subsystem 908 can be physically or logically co-located with each other in whole or in part. Moreover, although FIG. 9 illustrates a particular number of client devices 906, dynamic transportation systems 902, vehicle subsystems 908, and networks 904, this disclosure contemplates any suitable number of client devices 906, dynamic transportation systems 902, vehicle subsystems 908, and networks 904. As an example, and not by way of limitation, network environment 900 can include multiple client device 906, dynamic transportation systems 902, vehicle subsystems 908, and networks 904.

This disclosure contemplates any suitable network 904. As an example, and not by way of limitation, one or more portions of network 904 can include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 can include one or more networks 904.

Links can connect client device 906, dynamic transportation system 902, and vehicle subsystem 908 to network 904 or to each other. This disclosure contemplates any suitable links. For instance embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. For instance embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links can differ in one or more respects from one or more second links.

For instance embodiments, client device 906 can be an electronic device including hardware, software, or embedded logic components or a combination of two or more such components and capable of carrying out the appropriate functionalities implemented or supported by client device 906. As an example, and not by way of limitation, a client device 906 can include any of the computing devices discussed above in relation to FIG. 8. A client device 906 can enable a network user at client device 906 to access network 904. A client device 906 can enable its user to communicate with other users at other client devices 906.

For instance embodiments, client device 906 can include a requestor application or a web browser, such as MICROSOFT INTERNET EXPLORER, GOOGLE CHROME or MOZILLA FIREFOX, and can have one or more add-ons, plug-ins, or other extensions, such as TOOLBAR or YAHOO TOOLBAR. A user at client device 906 can enter a Uniform Resource Locator ("URL") or other address directing the web browser to a particular server (such as server), and the web browser can generate a Hyper Text Transfer Protocol ("HTTP") request and communicate the HTTP request to server. The server can accept the HTTP request and communicate to client device 906 one or more Hyper Text Markup Language ("HTML") files responsive to the HTTP request. Client device 906 can render a webpage based on the HTML files from the server for presentation to the user. This disclosure contemplates any suitable webpage files. As an example, and not by way of limitation, webpages can render from HTML files, Extensible Hyper Text Markup Language ("XHTML") files, or Extensible Markup Language ("XML") files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

For instance embodiments, dynamic transportation system 902 can be a network-addressable computing system that can host a transportation matching network. Dynamic transportation system 902 can generate, store, receive, and send data, such as, for example, user-profile data, concept-profile data, text data, transportation request data, GPS location data, provider data, requestor data, vehicle data, or other suitable data related to the transportation matching network. This can include authenticating the identity of providers and/or vehicles who are authorized to provide transportation services through the dynamic transportation system 902. In addition, the dynamic transportation system can manage identities of service requestors such as users/requestors. For instance, the dynamic transportation system can maintain requestor data such as driving/riding histories, personal data, or other user data in addition to navigation and/or traffic management services or other location services (e.g., GPS services).

For instance embodiments, the dynamic transportation system 902 can manage transportation matching services to connect a user/requestor with a vehicle and/or provider. By managing the transportation matching services, the dynamic transportation system 902 can manage the distribution and allocation of resources from the vehicle subsystems 908 and user resources such as GPS location and availability indicators, as described herein.

Dynamic transportation system 902 can be accessed by the other components of network environment 900 either directly or via network 904. For instance embodiments, dynamic transportation system 902 can include one or more servers. Each server can be a unitary server or a distributed server spanning multiple computers or multiple datacenters. Servers can be of various types, such as, for example and without limitation, web server, news server, mail server, message server, advertising server, file server, application server, exchange server, database server, proxy server, another server suitable for performing functions or processes described herein, or any combination thereof. For instance embodiments, each server can include hardware, software, or embedded logic components or a combination of two or more such components for carrying out the appropriate functionalities implemented or supported by server. For instance embodiments, dynamic transportation system 802 can include one or more data stores. Data stores can be used to store various types of information. For instance embodiments, the information stored in data stores can be organized according to specific data structures. For instance embodiments, each data store can be a relational, columnar, correlation, or other suitable database. Although this disclosure describes or illustrates particular types of databases, this disclosure contemplates any suitable types of databases. Particular embodiments can provide interfaces that enable a client device 906, or a dynamic transportation system 902 to manage, retrieve, modify, add, or delete, the information stored in data store.

For instance embodiments, dynamic transportation system 902 can provide users with the ability to take actions on various types of items or objects, supported by dynamic transportation system 902. As an example, and not by way of limitation, the items and objects can include transportation matching networks to which users of dynamic transportation system 902 can belong, vehicles that users can request, location designators, computer-based applications that a user can use, transactions that allow users to buy or sell items via the service, interactions with advertisements that a user can perform, or other suitable items or objects. A user can interact with anything that is capable of being represented in dynamic transportation system 902 or by an external system of a third-party system, which is separate from dynamic transportation system 902 and coupled to dynamic transportation system 902 via a network 904.

For instance, embodiments, dynamic transportation system 902 can be capable of linking a variety of entities. As an example, and not by way of limitation, dynamic transportation system 902 can enable users to interact with each other or other entities, or to allow users to interact with these entities through an application programming interfaces ("API") or other communication channels.

For instance, embodiments, dynamic transportation system 902 can include a variety of servers, sub-systems, programs, modules, logs, and data stores. For instance embodiments, dynamic transportation system 902 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Dynamic transportation system 902 can also include suitable components such as network interfaces, security mechanisms, load balancers, failover servers, management-and-network-operations consoles, other suitable components, or any suitable combination thereof. For instance embodiments, dynamic transportation system 902 can include one or more user-profile stores for storing user profiles. A user profile can include, for example, biographic information, demographic information, behavioral information, social information, or other types of descriptive information, such as work experience, educational history, hobbies or preferences, interests, affinities, or location.

The web server can include a mail server or other messaging functionality for receiving and routing messages between dynamic transportation system 902 and one or more client devices 906. An action logger can be used to receive communications from a web server about a user's actions on or off dynamic transportation system 902. A notification controller can provide information regarding content objects to a client device 906. Information can be pushed to a client device 906 as notifications, or information can be pulled from client device 906 responsive to a request received from client device 906. Authorization servers can be used to enforce one or more privacy settings of the users of dynamic transportation system 902. A privacy setting of a user determines how particular information associated with a user can be shared. The authorization server can allow users to opt in to or opt out of having their actions logged by dynamic transportation system 902 or shared with other systems, such as, for example, by setting appropriate privacy settings. Third-party-content-object stores can be used to store content objects received from third parties. Location stores can be used for storing location information received from client devices 906 associated with users.

In addition, the vehicle subsystem 908 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 908 can include an autonomous vehicle—i.e., a vehicle that does not require a human operator. In these embodiments, the vehicle subsystem 908 can perform maneuvers, communicate, and otherwise function without the aid of a human provider, in accordance with available technology.

For instance, the vehicle subsystem 908 can include one or more sensors incorporated therein or associated thereto. For example, sensor(s) can be mounted on the top of the vehicle subsystem 908 or else can be located within the interior of the vehicle subsystem 908. In certain embodiments, the sensor(s) can be located in multiple areas at once—i.e., split up throughout the vehicle subsystem 908 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

For instance embodiments, the vehicle subsystem 908 can include a communication device capable of communicating with the client device 906 and/or the transportation system 902. For example, the vehicle subsystem 908 can include an on-board computing device communicatively linked to the network 904 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

The invention claimed is:

1. A method comprising:
    analyzing data from one or more sensors associated with a vehicle, a computing device associated with the vehicle, and a requestor computing device associated with a transportation requestor, wherein analyzing the data comprises comparing motion data from the requestor computing device to motion data from the computing device associated with the vehicle to identify any consistencies between the motion data from the requestor computing device and the motion data from the computing device associated with the vehicle;
    based on analyzing the data from the one or more sensors, determining whether material has been left in the vehicle; and
    based on determining that material has been left in the vehicle, determining an action that corresponds to the material that has been left in the vehicle.

2. The method as recited in claim 1, further comprising:
    detecting that the transportation requestor exits the vehicle; and
    analyzing the data from the one or more sensors in response to detecting that the transportation requestor exits the vehicle.

3. The method as recited in claim 1, wherein analyzing the data further comprises:
    comparing a geographic location of the requestor computer device to a geographic location of the computing device associated with the vehicle to determine whether the requestor computing device is within a threshold distance of the computing device associated with the vehicle after the transportation requestor exits the vehicle.

4. The method as recited in claim 1, wherein analyzing the data further comprises:
    determining a signal strength between the requestor computing device and the computing device associated with the vehicle; and
    determining, based on the signal strength, whether the requestor computing device is within a threshold distance of the computing device associated with the vehicle after the transportation requestor exits the vehicle.

5. The method as recited in claim 1, wherein the one or more sensors comprise one or more of a camera, a motion sensor, an audio sensor, a pressure sensor, a moisture sensor, or an olfactory sensor.

6. The method as recited in claim 1, further comprising:
    determining one or more attributes of the material left in the vehicle based on the data from the one or more sensors; and
    identifying the material based on the one or more attributes of the material.

7. The method as recited in claim 1, wherein the action comprises at least one of:
    cancelling or preventing a subsequent transportation request associated with the vehicle;
    initiating a communication with the computing device associated with the vehicle;
    initiating a communication with the transportation requestor;

dispatching the vehicle to a predetermined location or to a location of the transportation requestor; or
causing the vehicle to emit a sound.
8. The method as recited in claim 1, further comprising:
determining that the action was ineffective; and
in response to determining that the action was ineffective, determining a second action corresponding to the material left in the vehicle.
9. The method as recited in claim 1, further comprising:
utilizing a machine learning model to calculate, based on the data from the one or more sensors, a confidence score indicating a likelihood that the material has been left in the vehicle; and
identifying the material that has been left in the vehicle based on the confidence score.
10. A system comprising:
at least one processor; and
at least one non-transitory computer readable storage medium storing instructions thereon that, when executed by the at least one processor, cause the system to:
analyze data from one or more sensors associated with a vehicle, a computing device associated with the vehicle, and a requestor computing device associated with a transportation requestor, wherein analyzing the data comprises comparing motion data from the requestor computing device to motion data from the computing device associated with the vehicle to identify any consistencies between the motion data from the requestor computing device and the motion data from the computing device associated with the vehicle;
based on analyzing the data from the one or more sensors, determine whether material has been left in the vehicle; and
based on determining that material has been left in the vehicle, determine an action that corresponds to the material that has been left in the vehicle.
11. The system as recited in claim 10, further comprising instructions that, when executed by the at least one processor, cause the system to:
detect that the transportation requestor exits the vehicle; and
analyze the data from the one or more sensors in response to detecting that the transportation requestor exits the vehicle.
12. The system as recited in claim 10, wherein analyzing the data further comprises:
comparing a geographic location of the requestor computer device to a geographic location of the computing device associated with the vehicle to determine whether the requestor computing device is within a threshold distance of the computing device associated with the vehicle after the transportation requestor exits the vehicle.
13. The system as recited in claim 10, further comprising instructions that, when executed by the at least one processor, cause the system to:
determine a signal strength between the requestor computing device and the computing device associated with the vehicle; and
determine, based on the signal strength, whether the requestor computing device is within a threshold distance of the computing device associated with the vehicle after the transportation requestor exits the vehicle.

14. A non-transitory computer readable storage medium comprising instructions that, when executed by at least one processor, cause a computer system to:
analyze data from one or more sensors associated with a vehicle, a computing device associated with the vehicle, and a requestor computing device associated with a transportation requestor, wherein analyzing the data comprises comparing motion data from the requestor computing device to motion data from the computing device associated with the vehicle to identify any consistencies between the motion data from the requestor computing device and the motion data from the computing device associated with the vehicle;
based on analyzing the data from the one or more sensors, determine whether material has been left in the vehicle; and
based on determining that material has been left in the vehicle, determine an action that corresponds to the material that has been left in the vehicle.
15. The non-transitory computer readable storage medium of claim 14, wherein the one or more sensors comprise one or more of a camera, a motion sensor, an audio sensor, a pressure sensor, a moisture sensor, or an olfactory sensor.
16. The non-transitory computer readable storage medium of claim 14, further comprising instructions that, when executed by the at least one processor, cause the computer system to:
determine one or more attributes of the material left in the vehicle based on the data from the one or more sensors; and
identify the material based on the one or more attributes of the material.
17. The non-transitory computer readable storage medium of claim 14, wherein the action comprises at least one of:
cancelling or preventing a subsequent transportation request associated with the vehicle;
initiating a communication with the computing device associated with the vehicle;
initiating a communication with the transportation requestor;
dispatching the vehicle to a predetermined location or to a location of the transportation requestor; or
causing the vehicle to emit a sound.
18. The non-transitory computer readable storage medium of claim 14, further comprising instructions that, when executed by the at least one processor, cause the computer system to:
determine that the action was ineffective; and
in response to determining that the action was ineffective, determine a second action corresponding to the material left in the vehicle.
19. The system as recited in claim 10, wherein the action comprises at least one of:
cancelling or preventing a subsequent transportation request associated with the vehicle;
initiating a communication with the computing device associated with the vehicle;
initiating a communication with the transportation requestor;
dispatching the vehicle to a predetermined location or to a location of the transportation requestor; or
causing the vehicle to emit a sound.
20. The non-transitory computer readable storage medium of claim 14, further comprising instructions that, when executed by the at least one processor, cause the computer system to:

determine a signal strength between the requestor computing device and the computing device associated with the vehicle; and determine, based on the signal strength, whether the requestor computing device is within a threshold distance of the computing device associated with the vehicle after the transportation requestor exits the vehicle.

\* \* \* \* \*